April 5, 1938.  F. B. YINGLING  2,113,207
ELECTRICAL CONTROL SYSTEM FOR LOCOMOTIVES
Filed Dec. 18, 1933  21 Sheets-Sheet 1
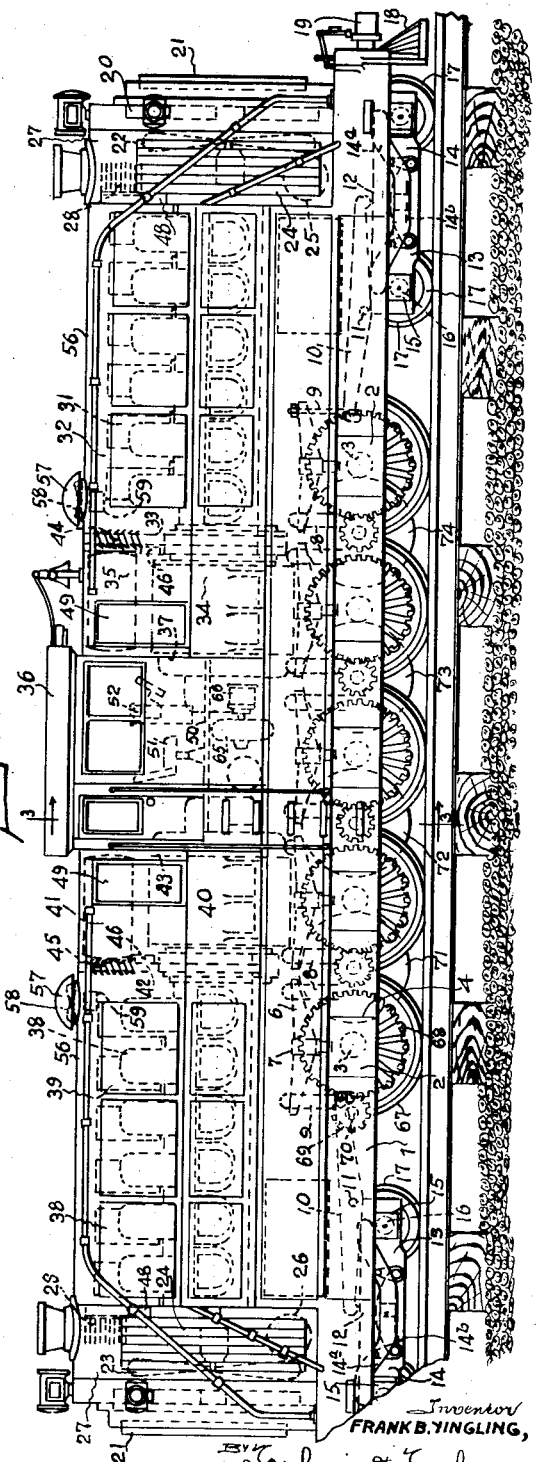
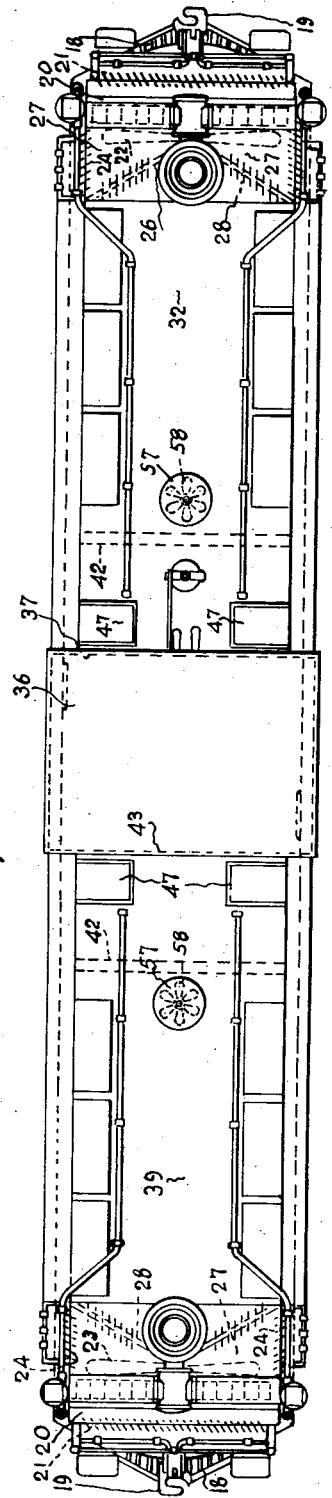
Inventor
FRANK B. YINGLING,
By Toulmin & Toulmin
Attorneys April 5, 1938. F. B. YINGLING 2,113,207
ELECTRICAL CONTROL SYSTEM FOR LOCOMOTIVES
Filed Dec. 18, 1933 21 Sheets-Sheet 2

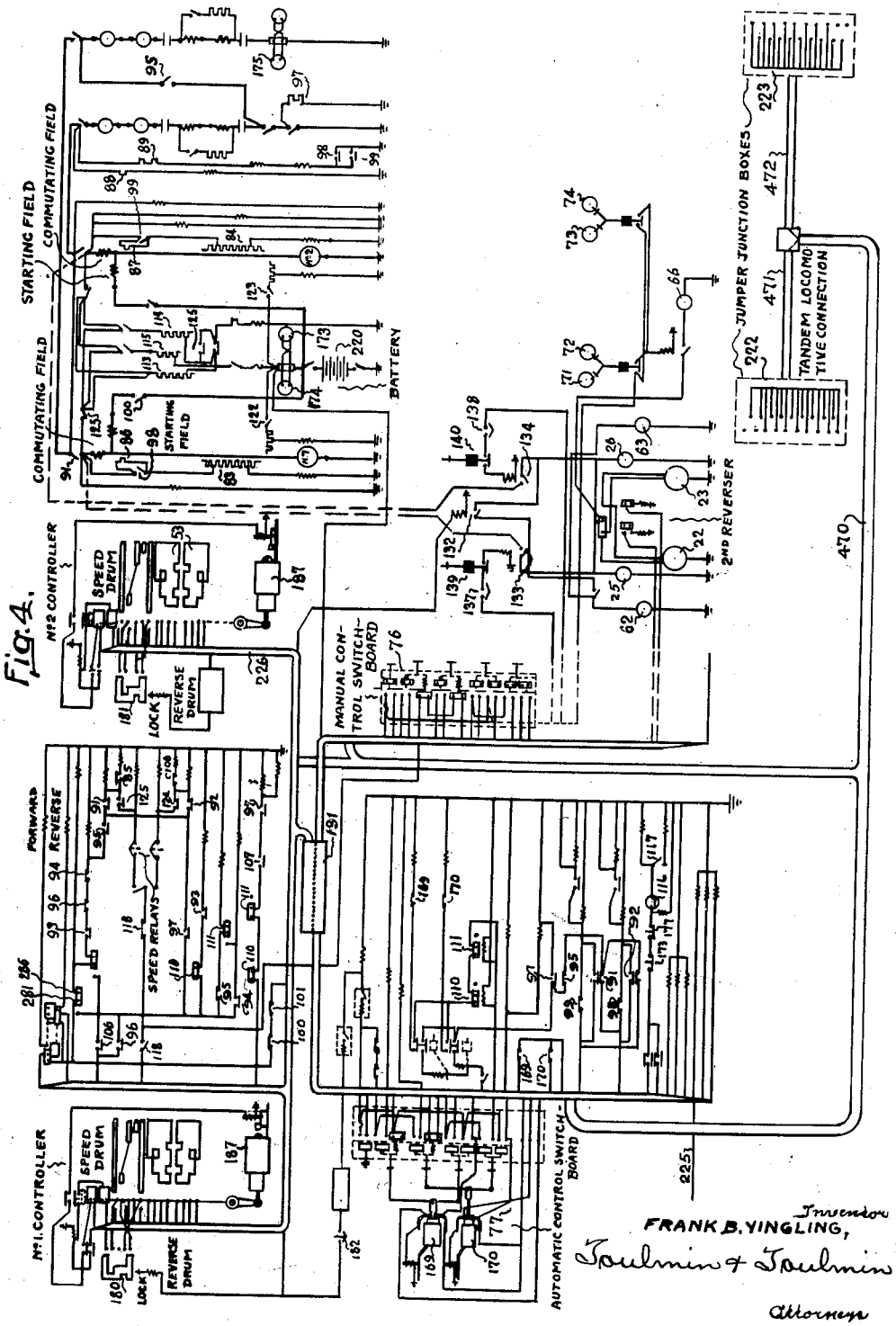

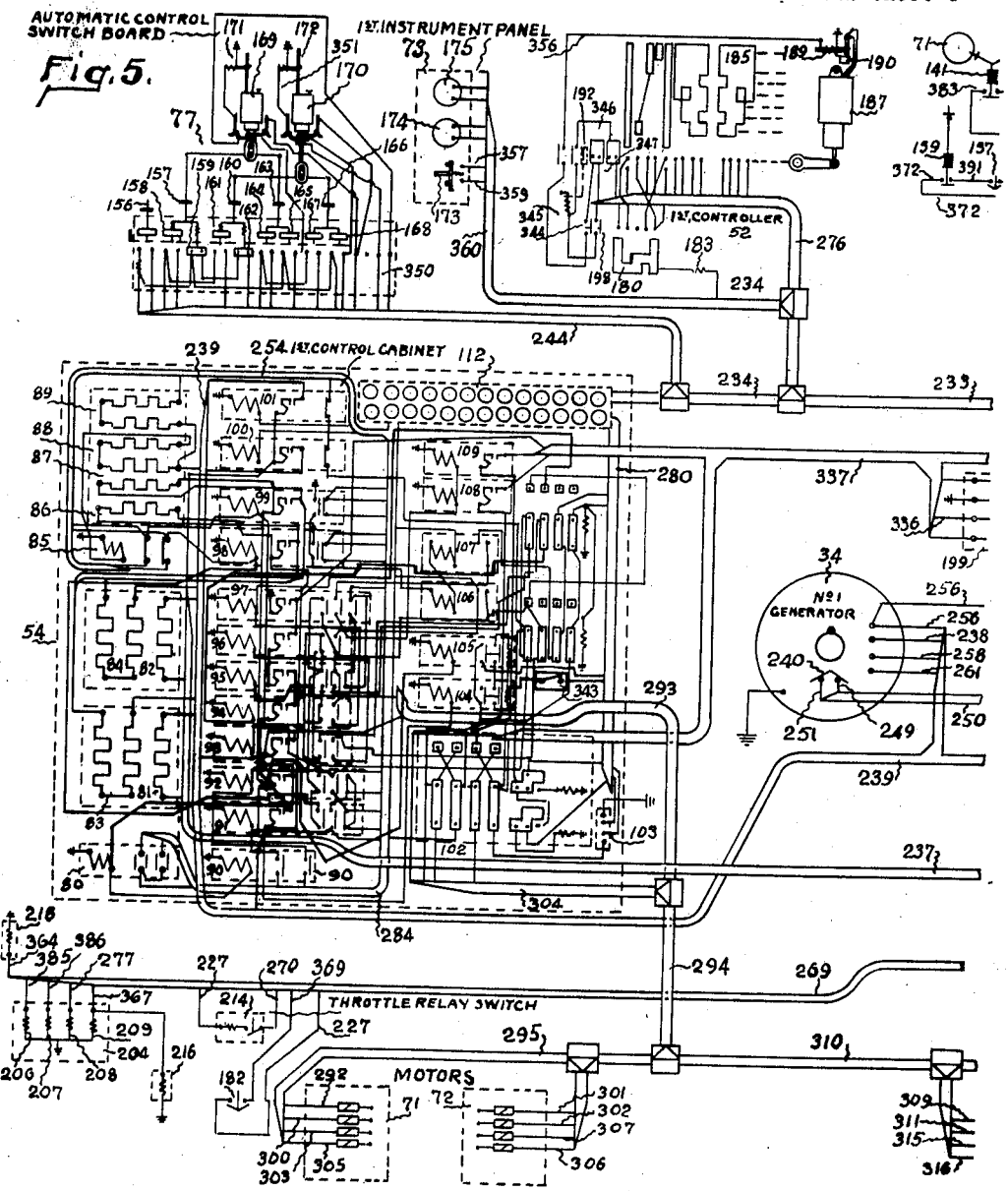

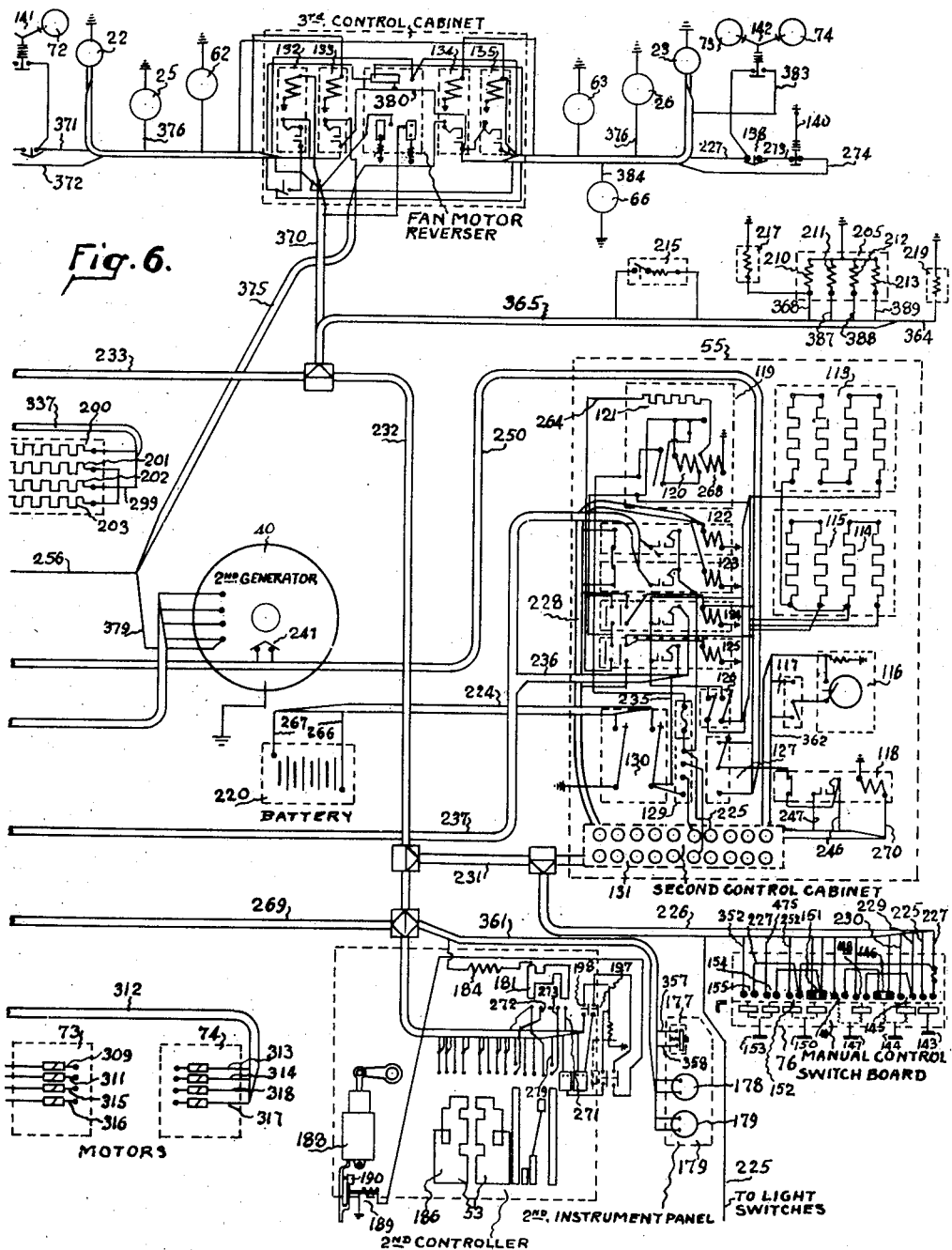

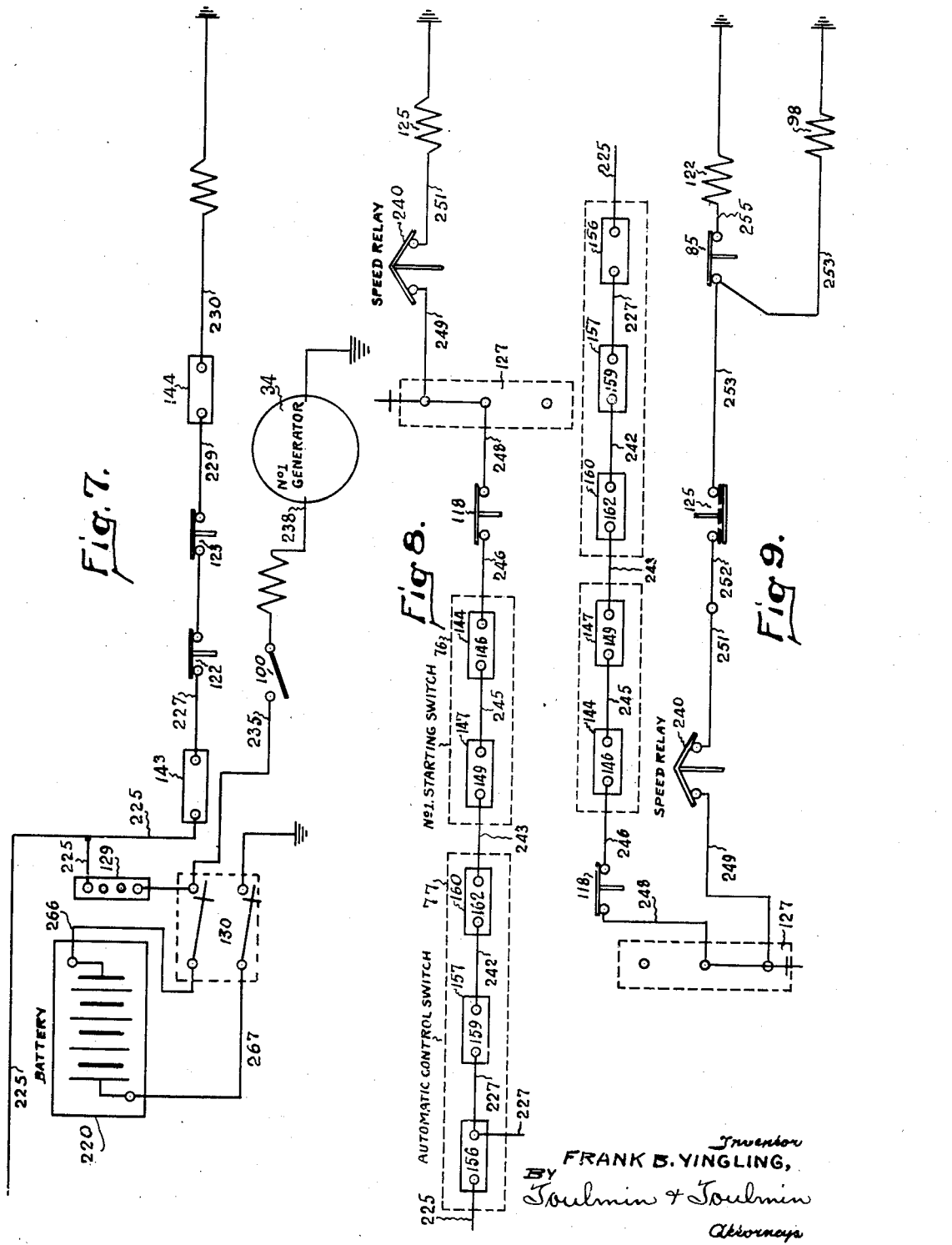

April 5, 1938.     F. B. YINGLING     2,113,207
ELECTRICAL CONTROL SYSTEM FOR LOCOMOTIVES
Filed Dec. 18, 1933     21 Sheets-Sheet 7
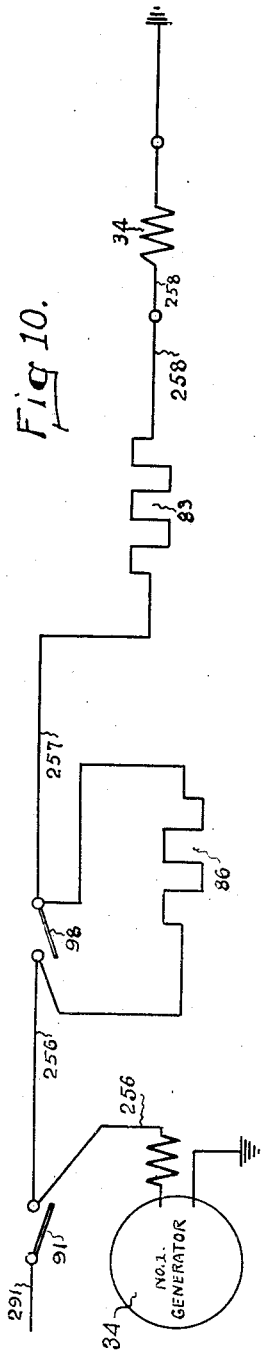
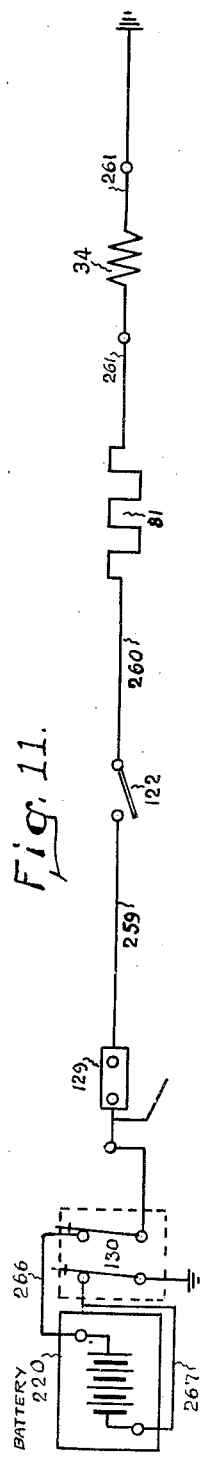
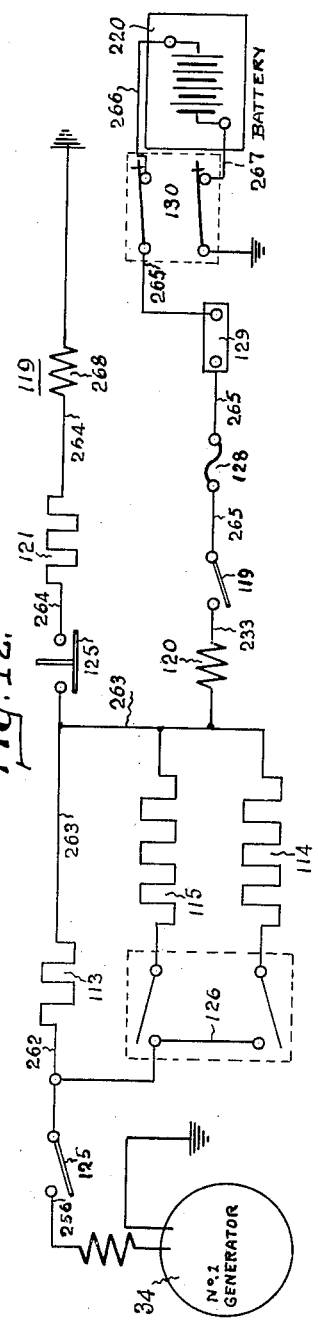
FRANK B. YINGLING, Inventor
Toulmin & Toulmin
Attorneys

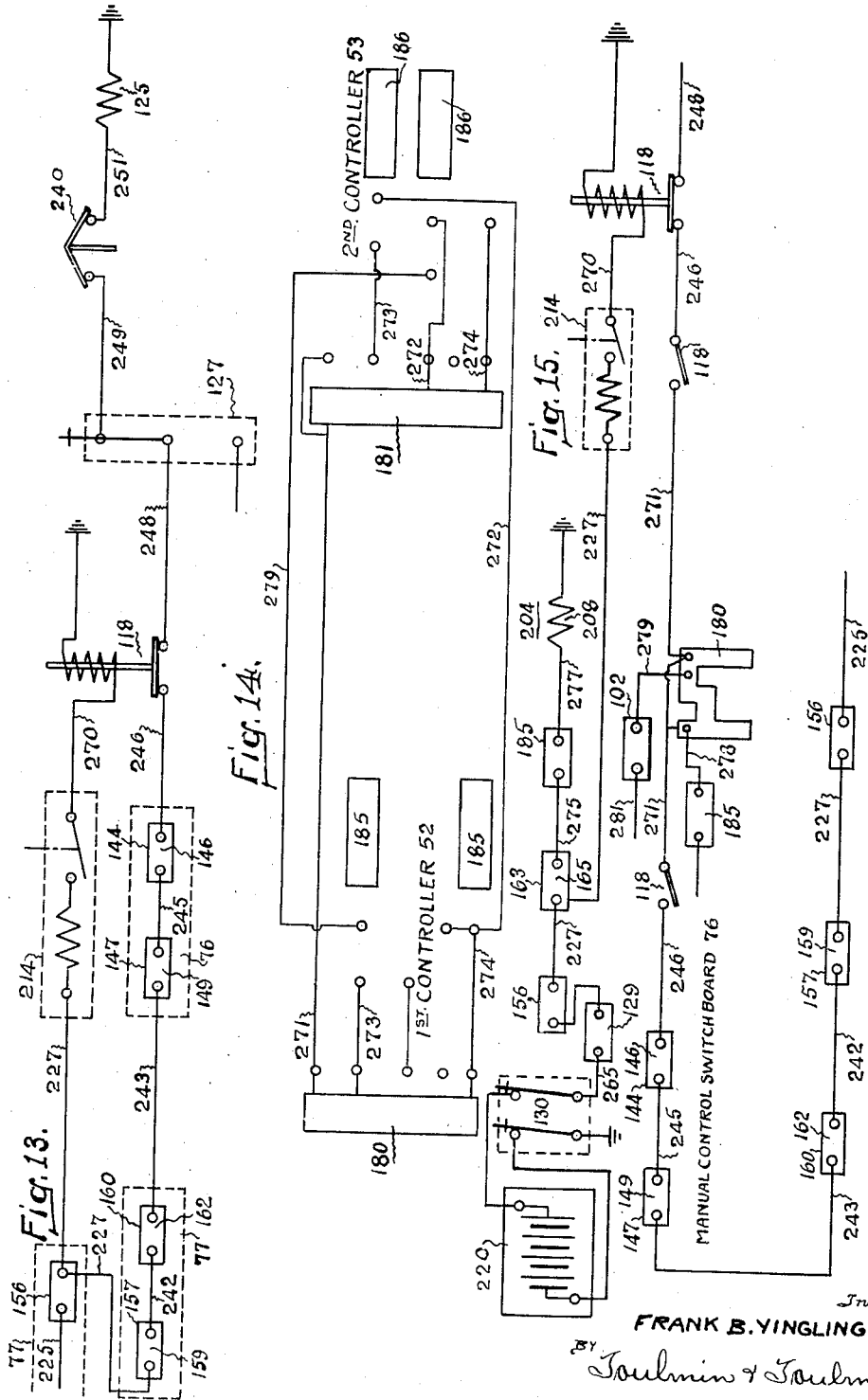

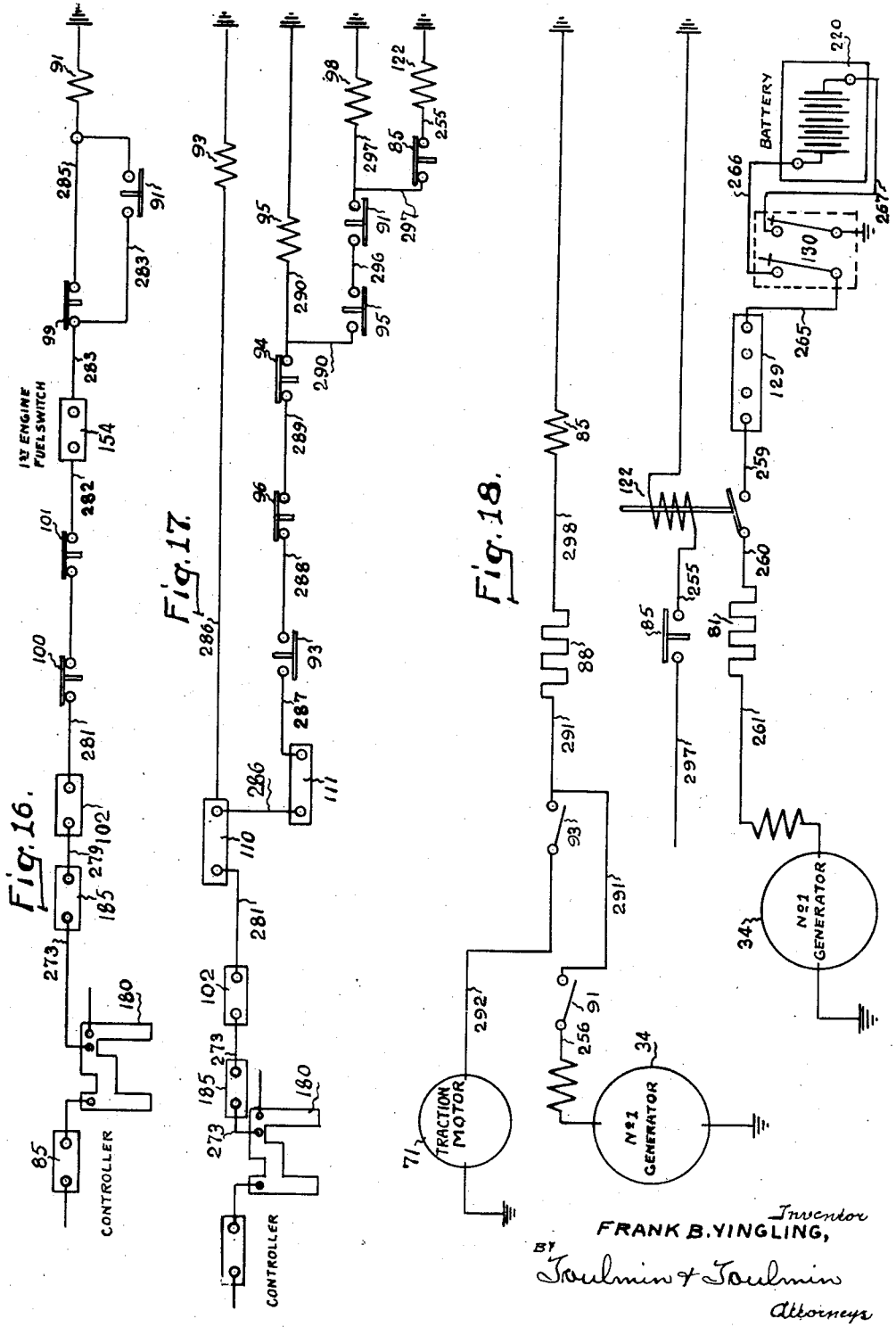

April 5, 1938.　　　　F. B. YINGLING　　　　2,113,207
ELECTRICAL CONTROL SYSTEM FOR LOCOMOTIVES
Filed Dec. 18, 1933　　　21 Sheets-Sheet 10

FRANK B. YINGLING, Inventor
Toulmin & Toulmin
Attorneys

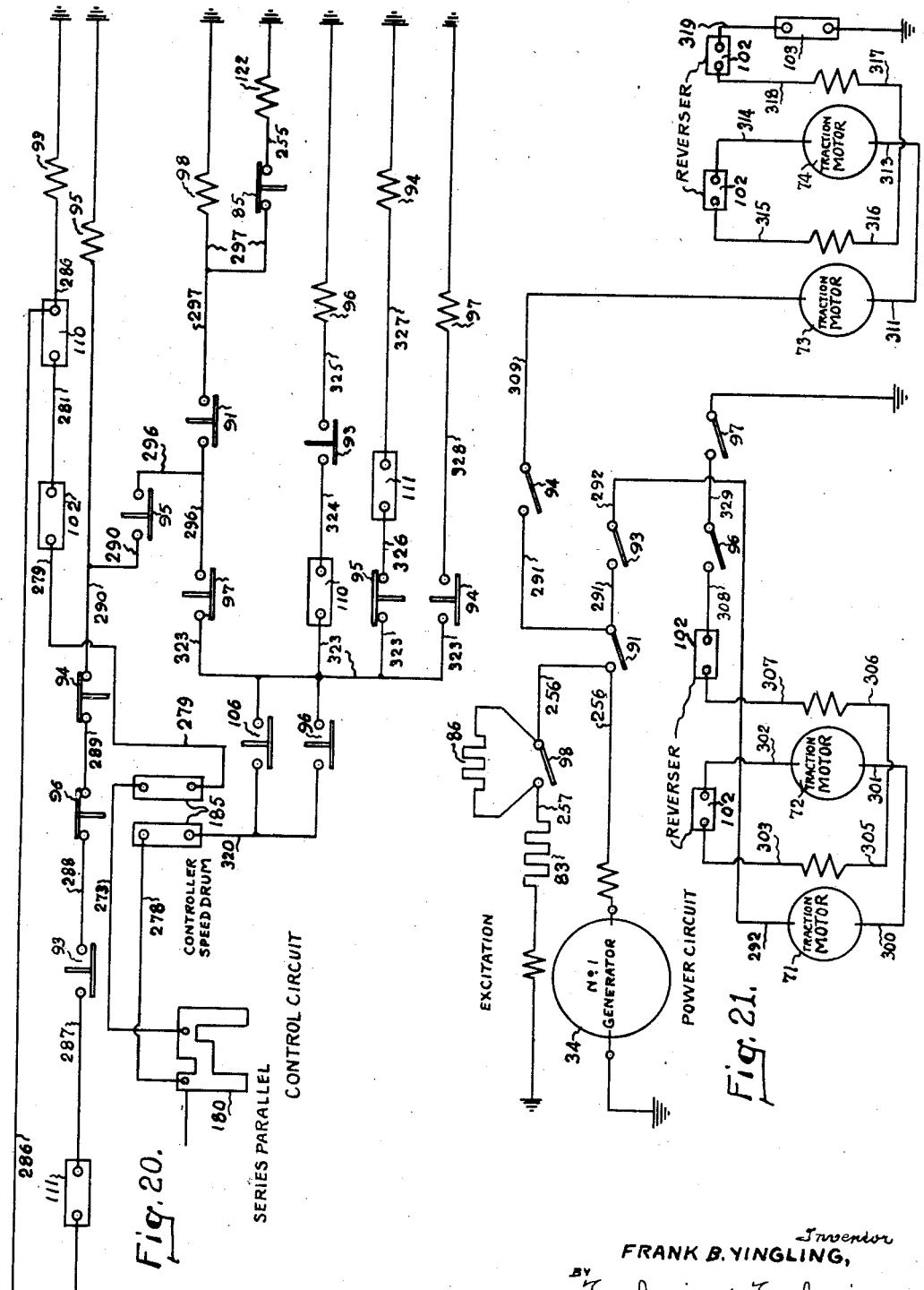

April 5, 1938.    F. B. YINGLING    2,113,207
ELECTRICAL CONTROL SYSTEM FOR LOCOMOTIVES
Filed Dec. 18, 1933    21 Sheets-Sheet 12
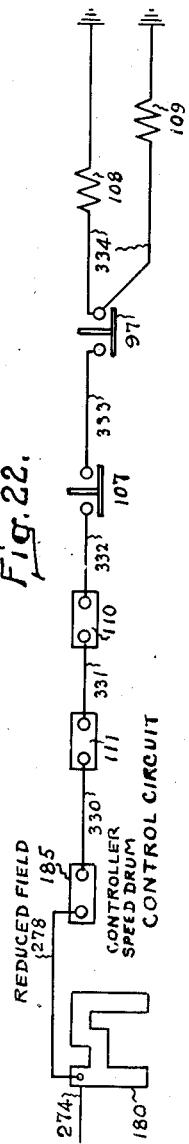
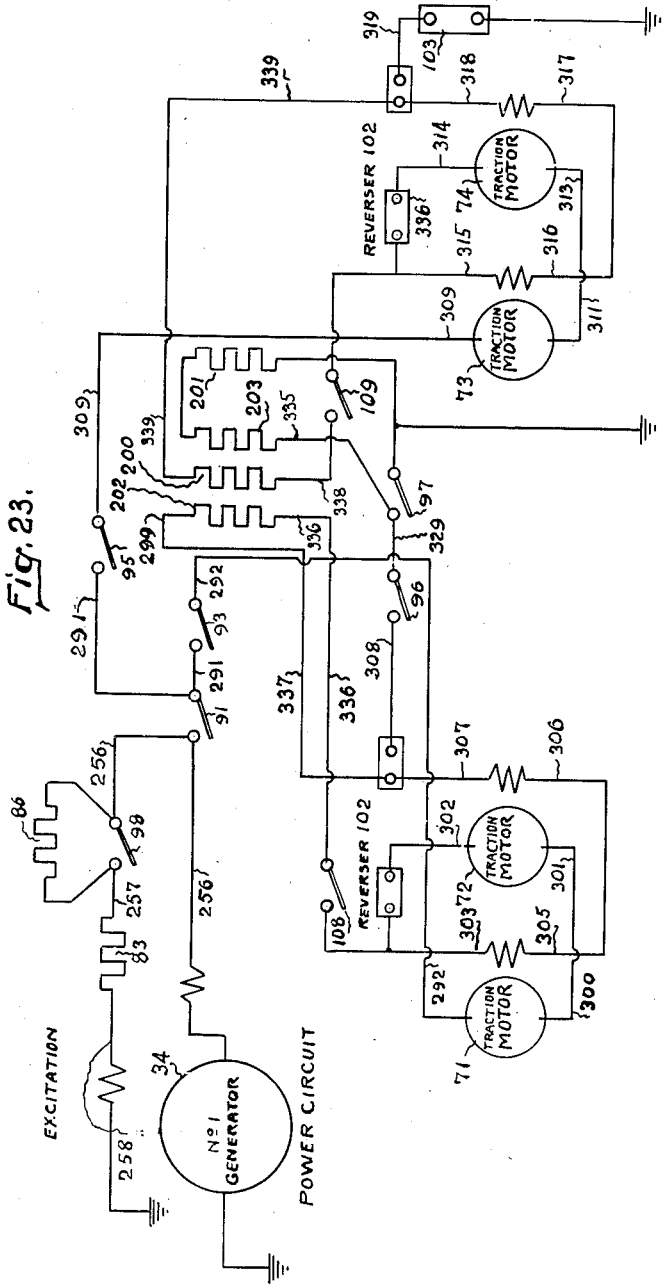
Inventor
FRANK B. YINGLING,
BY
Toulmin & Toulmin
Attorneys

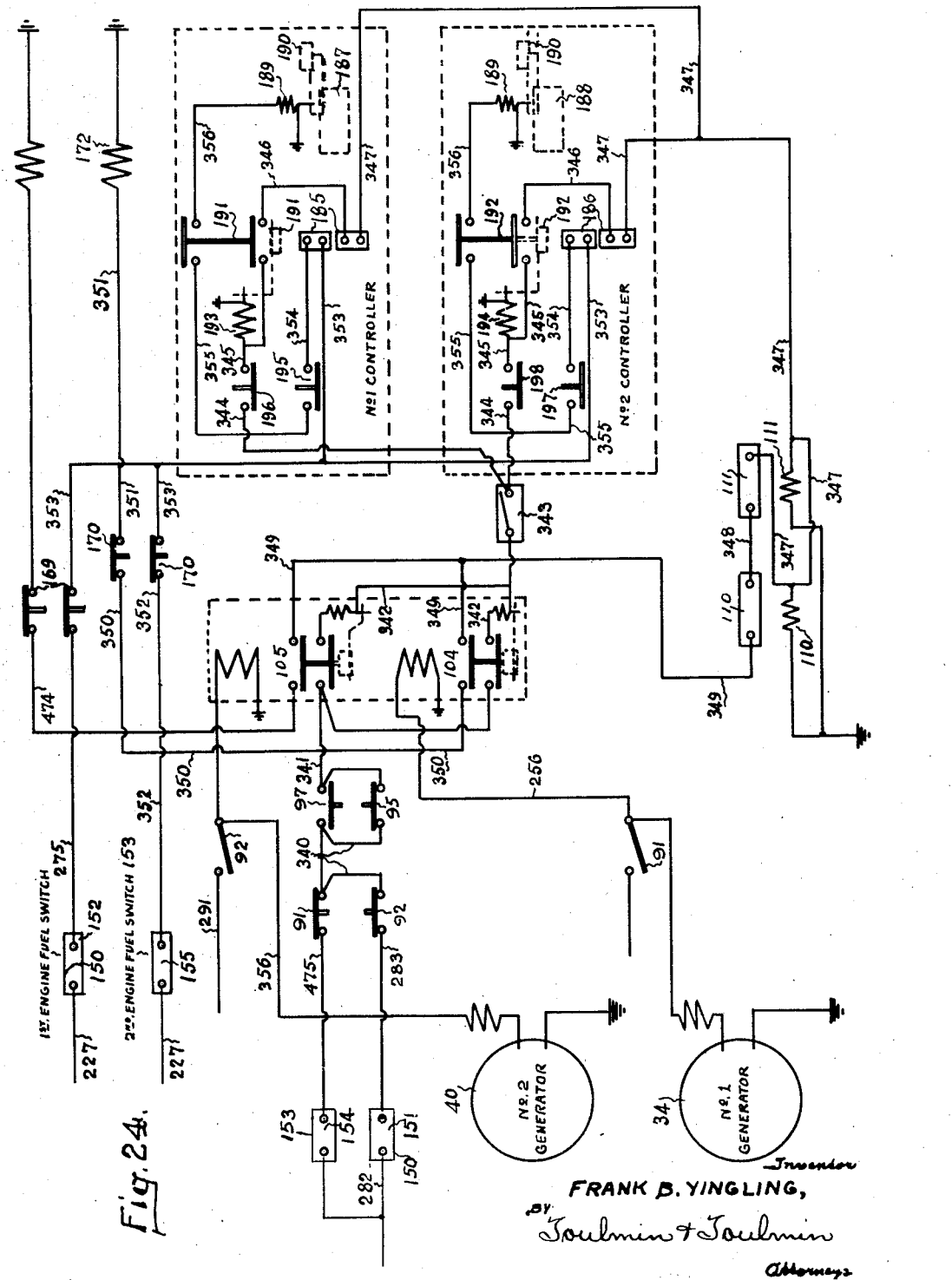

April 5, 1938.   F. B. YINGLING   2,113,207
ELECTRICAL CONTROL SYSTEM FOR LOCOMOTIVES
Filed Dec. 18, 1933   21 Sheets-Sheet 14

Inventor
FRANK B. YINGLING,
Toulmin & Toulmin
Attorneys

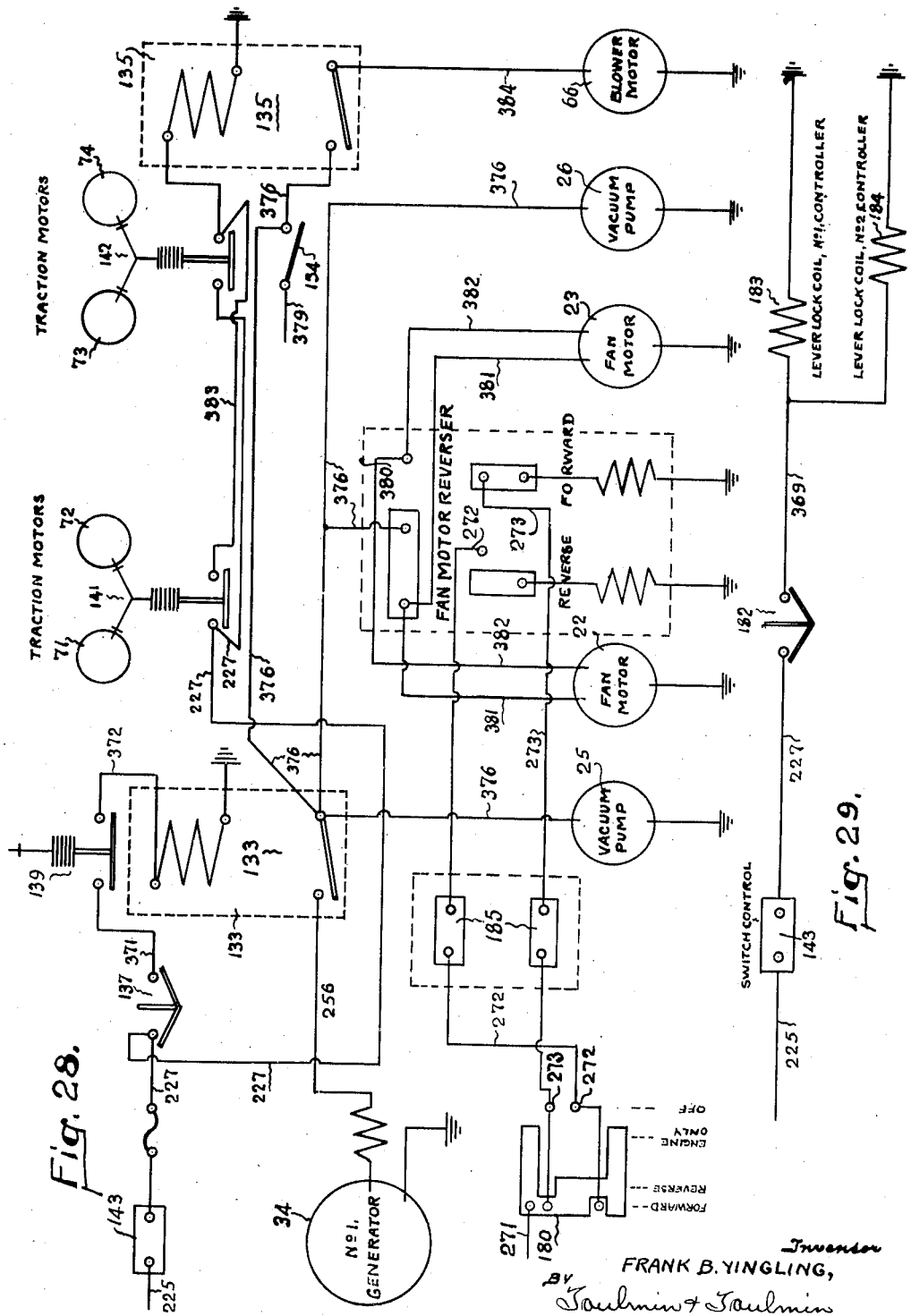

April 5, 1938. F. B. YINGLING 2,113,207
ELECTRICAL CONTROL SYSTEM FOR LOCOMOTIVES
Filed Dec. 18, 1933 21 Sheets-Sheet 17

BY FRANK B. YINGLING,
Toulmin & Toulmin
Attorneys

April 5, 1938.    F. B. YINGLING    2,113,207
ELECTRICAL CONTROL SYSTEM FOR LOCOMOTIVES
Filed Dec. 18, 1933    21 Sheets-Sheet 19

Fig. 33.

FRANK B. YINGLING, Inventor
By Toulmin & Toulmin
Attorneys

April 5, 1938.  F. B. YINGLING  2,113,207
ELECTRICAL CONTROL SYSTEM FOR LOCOMOTIVES
Filed Dec. 18, 1933  21 Sheets-Sheet 20

FRANK B. YINGLING, Inventor
BY Toulmin & Toulmin
Attorneys

April 5, 1938.  F. B. YINGLING  2,113,207
ELECTRICAL CONTROL SYSTEM FOR LOCOMOTIVES
Filed Dec. 18, 1933   21 Sheets-Sheet 21

Inventor
FRANK B. YINGLING,
By Toulmin & Toulmin
Attorneys

Patented Apr. 5, 1938

2,113,207

UNITED STATES PATENT OFFICE 2,113,207

ELECTRICAL CONTROL SYSTEM FOR LOCOMOTIVES

Frank B. Yingling, Hamilton, Ohio, assignor to Cyrus J. Fitton, Hamilton, Ohio

Application December 18, 1933, Serial No. 702,901

7 Claims. (Cl. 290—3)

This invention relates to Diesel-electric locomotives, and especially to electrical control systems for such locomotives.

An object of my invention is to provide an electrical control system for a Diesel-electric locomotive of sufficient power for main line, freight or passenger service, with automatically-controlled power requirements.

Another object is to provide such a control system whereby a combination of two such locomotives may be coupled in tandem with their cabs abutting one another and with intercommunicating duplex controls in each cab enabling one operator to control both locomotives from either cab, and also interconnecting the automatic control features.

Another object is to provide such a circuit with a series of remotely controlled electrical switches, relays, interlocks and contactors whereby a multiplicity of switching or controlling operations in widely separated places may be controlled either manually or automatically from a given control station.

Another object is to provide an electrical control system for a double-Diesel engine and generator locomotive installation wherein either or both engine-generators may be utilized either manually or automatically.

Another object is to provide an electrical control system for such a locomotive, wherein the locomotive may be fully controlled from either of two separated control stations, yet permitting the functioning of the automatic control features when either station is used.

Another object is to provide an electrical control system for such a locomotive, wherein the second engine-generator unit is automatically started and cut in on the line with another unit previously supplying power to one or more motors when the other unit becomes insufficient to supply the power demanded.

Another object is to provide an electrical control system for such a locomotive, wherein the second engine-generator unit will be automatically cut out of the line and stopped when the power demand drops below a certain minimum, leaving the power demand to be met by the engine-generator unit remaining in operation.

Another object is to provide an electrical control system for such a locomotive, wherein automatic provision is made for allowing the engine-generator to increase its speed beyond its ordinary maximum when the amperage rises beyond a predetermined amount.

Another object is to provide an electrical control system for such a locomotive, wherein a safety device is provided to prevent manual reversal of the locomotive while it is in motion, thus avoiding the possibility of damage to the machinery.

Another object is to provide an electrical control system for such a locomotive, wherein certain auxiliary motors for performing the various functions necessary to the safe or efficient operation of the main power plant are introduced and taken out automatically in proper sequence according to the demands of the main power plant.

Another object is to provide an electrical control system for such a locomotive, wherein motor driven air compressors are automatically started when the main engine has started and reached a certain predetermined temperature as well as a predetermined speed.

Another object is to provide an electrical control system for such a locomotive, wherein engine-cooling fan motors and/or engine-cooling vacuum pump motors are automatically started when the engine temperature rises above a certain predetermined amount and its speed increases beyond a fixed amount.

Another object is to provide an electrical control system for such a locomotive, wherein a traction motor cooling blower is automatically started when the traction motor temperature rises beyond a predetermined temperature.

Another object is to provide an electrical control system for such a locomotive, wherein ventilating fans are automatically started or stopped, and ventilating louvre shutters automatically opened or closed when the temperature of the compartment which they serve rises above or falls below a predetermined temperature, with particular reference to the engine, generator and cab compartments.

Another object is to provide an electrical control system for such a locomotive, wherein means is provided for automatically reversing the direction of rotation of the motor driven fans when the direction of motion of the locomotive is reversed.

In the drawings:

Figure 1 is a side elevation of a double-ended Diesel-electric locomotive having a double engine-generator and control installation.

Figure 2 is a plan view of the locomotive shown in Figure 1.

Figure 4 is a schematic wiring diagram of the entire electrical circuit for the locomotive shown in Figure 1, excluding the ventilator circuit.

Figure 5 is a typical wiring diagram of half of the entire electrical circuit shown in Figure 4, with the electrical elements assembled in their approximately proper locations.

Figure 6 is a typical wiring diagram of the remaining half of the electrical circuit shown in Figure 5.

Figure 7 is an individual wiring diagram of that part of the electrical circuit which is operative in starting the Diesel engines.

Figure 8 is an individual wiring diagram of that part of the circuit utilized in the first stage of charging the batteries.

Figure 9 is an individual wiring diagram of that part of the circuit utilized in the second stage of charging the batteries.

Figure 10 is an individual wiring diagram of that part of the circuit utilized in the third stage of charging the batteries.

Figure 11 is an individual wiring diagram of that part of the circuit utilized in the fourth stage of charging the batteries, that of introducing battery voltage to the generator teaser field to build up the generator voltage output more quickly.

Figure 12 is an individual wiring diagram of that part of the circuit utilized in the fifth stage of charging the batteries, showing the completion of the charging circuit.

Figure 13 is an individual wiring diagram of that part of the circuit utilized in the sixth stage of charging the batteries, showing how the battery charging circuit is disconnected when the controller speed drum is moved to start the motion of the locomotive.

Figure 14 is a wiring diagram of the two forward-and-reverse drums, showing the wiring interconnecting them.

Figure 15 is an individual wiring diagram of that part of the circuit utilized in the first stage of motion with the traction motors in a series arrangement.

Figure 16 is an individual wiring diagram of that part of the circuit utilized in the second stage of motion with the traction motors in a series arrangement.

Figure 17 is an individual wiring diagram of that part of the circuit utilized in the third stage of motion with the traction motors in a series arrangement, showing the manner in which separate battery excitation is applied to the teaser generator field to assist in building up the generator voltage quickly.

Figure 18 is an individual wiring diagram of that part of the circuit utilized in the fourth stage of motion with the traction motors in a series arrangement, showing the automatic removal of the teaser field from the generator when the generator voltage reaches a predetermined potential.

Figure 20 is an individual wiring diagram showing the control current circuit utilized when the traction motors are in a series-parallel arrangement.

Figure 21 is an individual wiring diagram of the power current circuit for the traction motors in a series-parallel arrangement.

Figure 22 is an individual wiring diagram showing the control current circuit when the traction motors are operated in a reduced field arrangement.

Figure 23 is an individual wiring diagram showing the power current circuit when the traction motors are operated in a reduced field arrangement.

Figure 24 is an individual wiring diagram showing the circuit for automatic overload starting and cut-in of the second engine-generator.

Figure 28 is an individual wiring diagram showing the control and power circuits for the fan, vacuum pump cooling and blower motors.

Figure 29 is an individual wiring diagram showing the safety device for locking the forward-and-reverse lever to prevent it from being operated while the locomotive is moving.

Figure 33 is a wiring diagram of part of the electrical circuit shown in Figure 6, enlarged to show the contents and connections of the third control cabinet and its associated electrical units.

*General construction*

Figure 3:
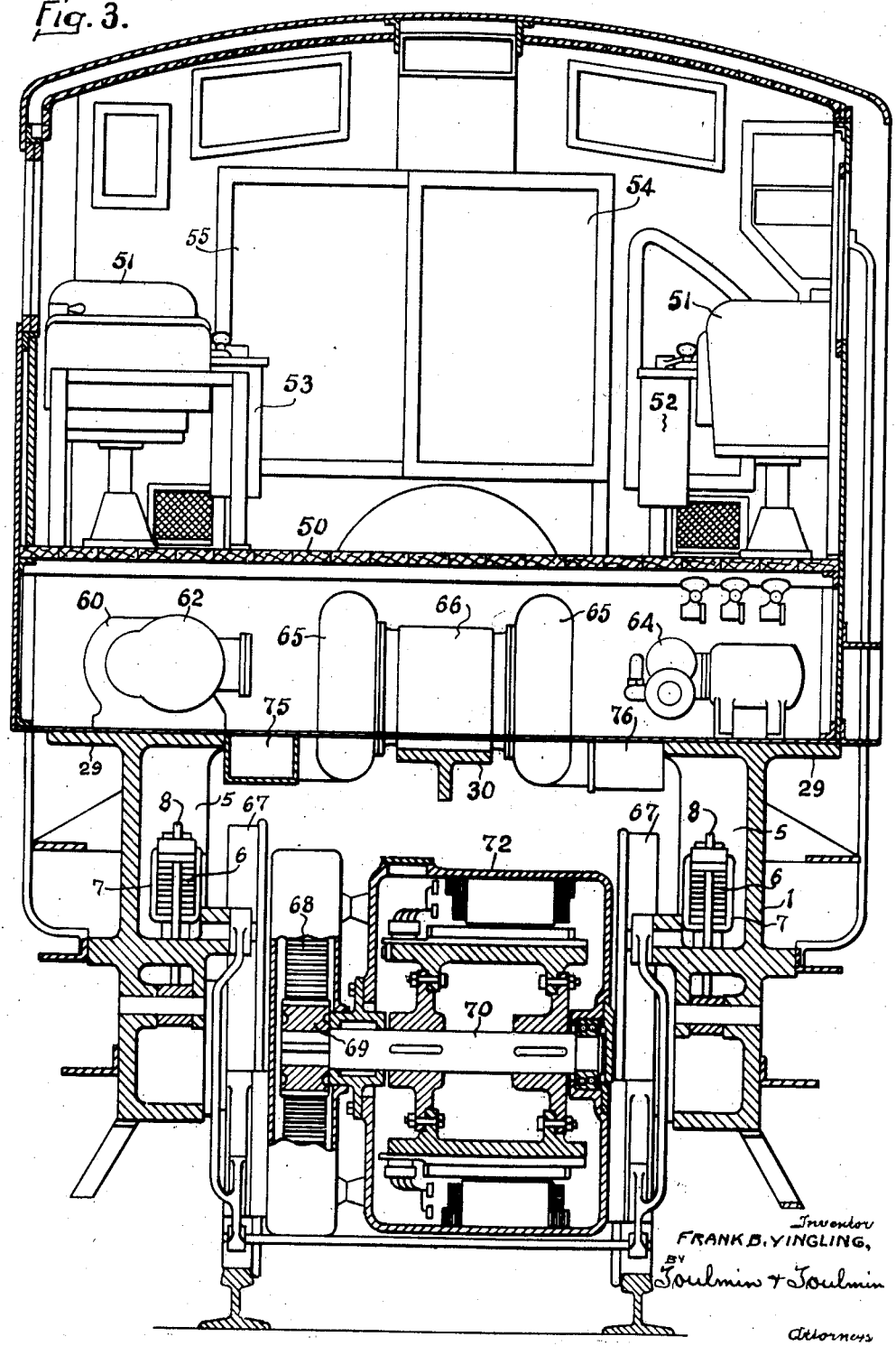
Figure 3 is a cross section through the cab of the locomotive along the line 3—3 of Figure 1, showing the arrangement of various control, motive and auxiliary apparatus.

In general, the locomotive to which my electrical control system is applied consists of the following parts which will be numerically designated when they are specifically described later. The locomotive, as shown in Figure 1, is of the double-ended type having a radiator and cooling system at each end, a Diesel engine and generator installation adjacent to each end, traction motors and connecting gearing arranged on the trucks containing the driving wheels, and a centrally located cab. The cab contains a dual set of controls and switch boards by which the locomotive may be operated with either or both of its engines. From this arrangement, it will be obvious that each set of the dual controls could also be located in a cab at each end of the locomotive without changing the essential electrical circuit. The Diesel engines are separated from the generators by a partition, each such compartment being individually cooled. The auxiliary motors, blowers and compressors are arranged beneath the floor of the cab, and the cooling fans are located one at each end of the locomotive immediately behind each radiator.

*Mechanical arrangement of the locomotive*

Referring to the drawings in detail, Figure 1 shows a double-ended Diesel-electric locomotive of the type which my electrical control system is to operate. This locomotive has preferably a one-piece side frame and chassis casting 1, hereinafter designated as the main frame 1. The main frame 1 is adapted to receive the journal blocks 2 of the axles 3 in the recesses 4 thereof. The main frame 1 also contains side frame recesses 5 for receiving the springs 6 whose clips 7 rest on the journal blocks 2 which are reciprocably mounted in the recesses 4 of the main frame 1. The springs 6 are connected at their ends to pitmen 8 pivotably connected to rocking links (not shown) which in turn are pivoted to the main frame 1. The outer free ends of the springs are joined by depending links 9 to rocking links 10 pivotably connected to the main frame at 11 and at their opposite ends to the center plates 12 of the trucks 13. The truck 13 is of any suitable pattern and carries a side frame 14 resting on the journal blocks 15 of the axles 16 carrying the truck wheels 17. The side frame 14 carries a side link 14a resting on the journal blocks 15 at its free ends and intermediate its ends is connected by swinging links to a semi-elliptical spring (14b shown). The truck 13 has a swiveled attachment to the main frame. The main frame 1 is provided with a cow-catcher 18 and a coupler 19.

At each end of the locomotive is a radiator 20 having louvre dampers 21 in front of it, motor driven fans 22 and 23 in back of each radiator, side louvres 24 on either side of the fan 23 and vacuum pumps 25 and 26 beneath the fans 22 and 23. A V-shaped partition 28 separates each fan compartment 27 from the engine compartments 32 and 39. The fans 22 and 23 are reversible and operate in the opposite direction when the direction of travel of the locomotive is reversed, by electrical means hereinafter set forth in detail. The vacuum pumps 25 and 26 are provided to increase the efficiency of the radiator, and are electro-thermostatically controlled in a manner, also described later.

The main frame 1 is provided with longitudinally disposed upper transverse flanges 29 (Figure 3), which act as a support for the main parts of the engine. A longitudinal rib 30 may also be provided for additional support for these parts.

Mounted upon the main frame flanges 29 is the first Diesel engine 31 in the first engine compartment 32 having a partition 33 through which the first Diesel engine 31 is directly connected to drive the first generator 34 which is also mounted upon the flanges 30 of the main frame 1 in the first generator compartment 35. The first generator compartment 35 is separated from the cab 36 by a partition 37 therebetween (Figure 2). In a similar manner the opposite end of the locomotive contains the Diesel engine 38 similarly mounted on the main frame 1 in the second engine compartment 39. The second Diesel engine 38 is direct-connected to the second generator 40 in the second generator compartment 41 through the partition 42 therebetween. The second generator compartment 41 likewise has a partition 43 separating it from the interior of the cab 36.

In the partition walls 33 and 42 between the generator and engine compartments, respectively, are the motor-operated louvre shutters 44 and 45 controlled by the thermostatic relays 46. In a similar manner the partitions 28 between the fan compartments 27 and the engine compartments 32 and 39 likewise contain motor-operated louvre shutters controlled by thermostatic relays 48. The roof 56 covering the engine and generator compartments is provided with a dome 57 containing a fan 58 driven by the motor 59 and motor-operated louvre shutters 400 (Figure 36) controlled by the thermostatic relays 404. In the manner thus described, the generator and engine compartments may be maintained at the most efficient temperatures. Two side doors 49 are provided in each generator compartment 35 and 41.

The cab 36 is provided with a raised floor 50 (Figure 3) on which are mounted oppositely disposed seats 51 adjacent to the first and second controllers 52 and 53. The cab also contains the first control cabinet 54 and the second control cabinet 55, the former of which is most clearly shown in Figure 4. The contents of these cabinets will be described later.

Beneath the cab floor 50 are mounted various auxiliary machines. Among these are two compressors 60 and 61 driven by the compressor motors 62 and 63 (only one shown) for providing compressed air for the air brake mechanism 64. The blowers 65 driven by the blower motor 66 provide force-fed cooling air for cooling the main traction motors 71, 72, 73 and 74 through the blower conduits 75 and 76.

The running gear of the locomotive comprises the springs 6 mounted in the manner already described and supporting the journal blocks 2 which rotatably support the axles 3 to which are attached the driving wheels 67 (Figures 1 and 3). With the driving wheels 67 are associated the driving gears 68 which in turn are engaged by the driving pinions 69 mounted on the armature shafts 70 of each of the four traction motors 71, 72, 73 and 74.

*General arrangement of electrical assemblies*

The electrical apparatus of the locomotive is divided into individual elements, such as the traction motors 71, 72, 73 and 74, and also into a plurality of assemblies, each of which contains a multiplicity of individual electrical elements (Figures 5, 6, 31 and 32). Among the assemblies already mentioned are the first control cabinet 54, the second control cabinet 55, the first controller 52, and the second controller 53. In addition to these electrical assemblies, there is also a third control cabinet 75, a manual control switchboard 76, an automatic switch board 77, a first instrument panel 78, a second instrument panel 79. Each of these assemblies contains electrical parts which are at some times active and at other times inactive, depending upon the particular stage of the operation of the locomotive. In the following description, each stage of this operation is fully set forth, together with the electrical parts which are active as well as the details of the wiring connections between them. To avoid repetition it will, therefore, be sufficient first to list all of the electrical parts in each electrical assembly without specifying the detailed wiring connections which are fully described later.

Contents of the first control cabinet

The first control cabinet 54 (Figure 31) contains, in general, a number of electrical contactor switches and interlocks, a number of resistors, a reverser, several relays and certain cut-out switches. The apparatus in the first control cabinet 54 is distributed substantially on four levels. The upper level contains, from left to right: the time under-current relay 80 having upper and lower normally-open interlocks; the separately-excited generator field resistors 81 and 82; the self-excited generator field resistors 83 and 84; the teaser field control voltage relay 85 having upper and lower normally-closed interlocks; the self-excited generator field transfer resistors 86 and 87; the teaser field relay resistor 88; and the traction motor transfer and field shunting relay resistor 89.

The second level of the first control cabinet 54 contains, from left to right: the time over-current governor relay 90 having upper and lower normally-open interlocks; the generator contactor switches 91 and 92 having normally-open main contactors, normally-open upper and middle interlocks, and normally-closed lower interlocks; the series motor contactor switch 93 having a normally-open main contactor and upper and lower interlocks; the series-parallel motor contactor 94 having a normally-open main contact switch, a normally-closed upper interlock and a normally-open lower interlock; the series motor contactor 95 having a normally-open main contactor, a normally-open upper interlock, a normally-closed middle interlock, and a normally-closed lower interlock; the series-parallel motor contactor 96 having a normally-open main contactor, a normally-closed upper interlock and a normally-open lower interlock; the transfer resistor contactor 97 having a normally-open main contactor, and normally-open upper, middle and lower interlocks; the generator shunt field contactors 98 and 99, each having a normally-open main contactor, a normally-open upper interlock and normally-closed interlock; and the engine starting contactor switches 100 and 101 each having a normally-open main contactor and a normally-closed interlock.

The third level of the first control cabinet 54 contains the following parts: the reverser 102 having four switch elements or blades; an ammeter shunt 103; the two time over-current relays 104 and 105, each having two normally-open interlocks; the traction motor transfer control voltage relay 106 having a single normally-open contactor; the traction motor field-shunting control voltage relay 107 having a single normally-open contactor; the traction motor field-shunting contactor switches 108 and 109, each having a single normally-open contactor switch; the two traction motor control cut-out switches 110 and 111, each having four switch blades, those of 110 cutting out motors 71 and 72, whereas those of 111 cut out motors 73 and 74; and the single-pole single-throw knife switch 343.

The major part of the wires interconnecting the above electrical elements in the first control cabinet 54 are brought out to a terminal board 112.

Contents of the second control cabinet

The second control cabinet 55 (Figure 32) contains electrical apparatus arranged substantially on two levels.

The upper level of the second control cabinet 55 contains the following parts: the battery charging resistor unit 113 consisting of a number of individual resistors connected in series; the battery charging resistors 114 and 115, each having a pair of individual resistors connected in series; the set-time relay 116 having a single normally-open switch; below the latter the selective under-load engine cut-out switch 117; and the control relay contactor switch 118 having one main contactor and one normally-closed interlock.

The second level of the second control cabinet contains the following parts: the reverse current relay 119 having a single normally-open contactor, a series coil 120 below its operating coil 268, and likewise having a resistor 121; the separately-excited generator field contactor switches 122 and 123, each having normally-open contactor and a single normally-closed interlock; the battery charging contactor switches 124 and 125, each having a single contactor and upper and lower normally-open interlocks; the double-pole single-throw battery charging resistor switch 126; the single-pole double-throw selective battery charging switch 127; below the latter the battery fuse cut-out 128 and the appropriate battery ammeter shunt 129; below these the double-pole single-throw battery disconnecting switch 130; and the terminal board 131 to which many of the leads of the interconnecting wires in this cabinet are brought out.

Contents of the third control cabinet and accessories

The third control cabinet 75 (Figure 33) contains several contactor switches and a group of other apparatus closely associated therewith. The third control cabinet 75 itself contains the following apparatus: the compressor motor contactor switch 132 having a single contactor only; the engine cooling motor contactor switches 133 and 134, each having a single contactor only; the blower motor contactor switch 135 with a single contactor only; the air compressor pressure switch 136, and the fan motor reverser 380. (Fig. 33.)

Electrically connected to the apparatus in the third control cabinet 75, as specified in detail later, are the following parts, consisting largely of two sets of like apparatus: the engine cooling motor control speed switches 137 and 138, each having an interlock open at low speed; the engine cooling temperature control relays 139 and 140, each having an interlock open at low temperatures; the motor-temperature blower-motor control relays 141 and 142, each having an interlock open at low temperatures, the former being connected to motors 71 and 72, the latter to motors 73 and 74. Also connected to the third control cabinet are the following electrical units: the engine cooling vacuum pump motors 25 and 26; the air compressor motors 62 and 63; and the blower motor 66. The operations of these various units will be described later.

Contents of control switchboards and instrument panels

The manual control switchboard 76 contains the following electrical units: the control switch 143; the first engine starting switch 144 having the normally-open blade 145 and the normally-closed blade 146; the second engine starting switch 147 having the normally-open blade 148 and the normally-closed blade 149; the first engine fuel switch 150 having the two normally-open blades 151 and 152; and the second engine fuel switch 153 having two normally-open blades 154 and 155. (Figure 6.)

Figure 34:
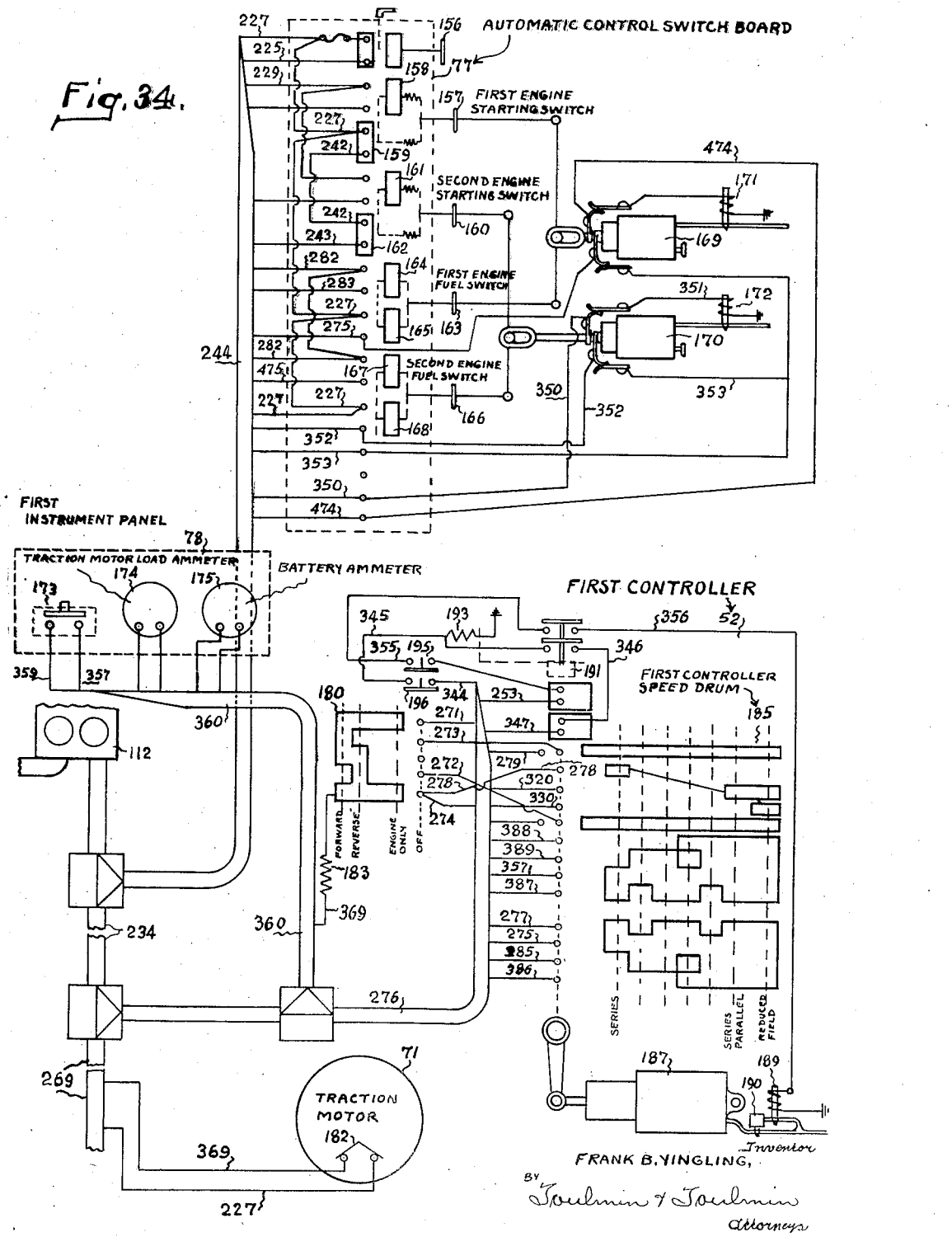
Figure 34 is a wiring diagram of part of the electrical circuit shown in Figure 5, enlarged to show the automatic switch-board and controller connections.

The automatic control switchboard 77 (Figure 34) contains the following electrical units: the control switch 156 with a single blade; the first engine starting switch 157 having the normally-open blade 158 and the normally-closed blade 159; the second engine starting switch 160 having the normally-open blade 161 and the normally-closed blade 162; the first engine fuel switch 163 having the normally-open blades 164 and 165; and the second engine fuel switch 166 having the two normally-open blades 167 and 168. Likewise associated with the automatic control switchboard 77 are the electro-pneumatic switch closers 169 and 170, the former simultaneously operating the first engine starting switch 157 and the first engine fuel switch 163, whereas the latter simultaneously actuates the second engine starting switch 160 and the second engine fuel switch 166. The air valves of the switch closers 169 and 170 are operated by the electrical working coils 171 and 172 respectively, thus providing a remote control for actuating the various switches of the automatic control switchboard 77. (Figures 5 and 34.)

The first instrument panel 78 (Figure 34) contains the following electrical units: momentary break-contact switch 173, which is a type of push button switch; the battery ammeter 174; and the traction motor load ammeter 175.

The second instrument panel 79 (Figure 6) contains the following electrical units; the momentary break-contact switch 177, also a push button type of switch; the battery ammeter 178; and the traction motor load ammeter 179.

Controller parts and units

The first and second controllers 52 and 53 are essentially the same in construction and operation, the slight differences in the electrical connections will be brought out when the operation is described later. (Fig. 34.)

The controllers 52 and 53 are of the usual drum type well known to those skilled in the electrical art. The first and second forward-and-reverse drums 180 and 181 consist of a drum made of conducting material, such as cast iron, and having irregularly disposed contact members arranged around the periphery of the drum in such a manner as to make contact with a number of fingers so placed as to engage the contact members. As the drum is rotated, its regularly disposed contact members make and break contact between various combinations of conductors connected to the contact fingers. The forward-and-reverse drums 180 and 181 themselves constitute a unitary conductor, the handle of which is insulated therefrom.

Each forward-and-reverse drum is equipped with a safety device which prevents it from being shifted while the locomotive is in motion. This safety device consists essentially of a forward-and-reverse lever lock-out relay 182 operatively connected to one of the locomotive driving members, such as an axle, and normally-open when the locomotive is at rest. The lock-out relay 182 is electrically connected to forward-and-reverse lever lock-outs 183 and 184, an operating coil and a multiple latching member actuated thereby. When the locomotive is moving, current flows through the operating coil of the lock-out 183 and moves the latch into engagement with the forward-and-reverse drum 180 or 181, a similar locking device being provided for each such drum. When the locomotive is at rest, the lock-out relay 182 flies open, breaking the circuit and causing the lock-outs 183 and 184 to release their latching members from engagement with the forward-and-reverse drums 180 and 181. This safety device prevents possible burning out or damage to the motors through accidental or inadvertent shifting of the forward-and-reverse drums during the motion of the locomotive. (Figure 34.)

The first and second controller speed drums 185 and 186, in general, are of the conventional type used in the operation of electrical locomotives. They possess the usual irregularly-segmented drums for series, series-parallel and reduced-field operation of the traction motors. The successive stages and connections in such stages are indicated by the dotted lines passing through the illustration on the wiring diagram (Figures 5, 6 and 34), hence by following the dotted line it is at once seen which of the contact fingers are joined by the irregularly-placed speed drum contact members. The exact connections of the speed drums 185 and 186 will be described later under the operation thereof. The speed drums 185 and 186 are provided with electro-pneumatic shifters 187 and 188 actuated by compressed air, the entrance of which is controlled by the electro-pneumatic operating units 189 and 190. The shifters are actuated in the opposite direction by a coiled compression spring surrounding the piston rod of the shifter 187 or 188. The operation of the shifters 187 and 188 will be described later.

Also associated with the first and second controller speed drums 185 and 186 are the air-operated controller handle ratchet segments 191 and 192, each having two normally-open interlocks associated therewith, and controlled by the electrical operating coils 193 and 194 respectively. (Figure 34).

The forward-and-reverse drums 180 and 181 also have associated with them the normally-open interlock switches, each operated as a pair: the forward-and-reverse drum 180 has the paired interlocks 195 and 196, whereas the forward-and-reverse drum 181 has the similar paired interlocks 197 and 198.

Electrical units not otherwise grouped

The majority of electrical units are grouped in the assemblies described above. The first and second generators 34 and 40 have been described previously as directly connected to the first and second Diesel engines 31 and 38 respectively. The four traction motors 71, 72, 73 and 74 have likewise been described above. Associated with, but separated from the first control cabinet 54 is the traction motor field shunting resistor assembly 199 consisting of the resistors 200, 201, 202 and 203, the connections of which will be described later in connection with their operation. (Figures 5 and 6).

Isolated from the remainder of the electrical units are the two throttle operators, generally designated 204 and 205. The first throttle operator 204 contains the four coils 206, 207, 208 and 209, whereas the second throttle operator 205 has similar coils 210, 211, 212 and 213. The throttle operators 204 and 205 have their various coils associated with and electrically connected to the contact fingers of the first and second controller speed drums 185 and 186 in a manner to be described under the operation of the latter. (Figures 5 and 6).

Also isolated are the throttle relay switches 214 and 215, each having an operating coil and a single contactor switch which is open when the motor is idling. (Figures 5 and 6.)

Associated with the first and second Diesel engines 31 and 38 are the electro-pneumatically operated engine governor lifters 216 and 217, each having an electrically connected operating coil whose operation will be described later. Also associated with the first and second Diesel engines 31 and 38 are the engine fuel supply cut-off valve operators 218 and 219, each having its own electrically connected operating coil. (Figures 5 and 6.)

The storage battery 220 is of the usual type and requires no particular description. The principal terminals of the battery 220 are directly connected to the battery switch 130, one pole of which is grounded and the other connected to the remainder of the apparatus in the manner described later. (Figure 6.)

The various conduits and individual wires will be numerically designated, where necessary, under the discussion of their operation.

Figure 30:
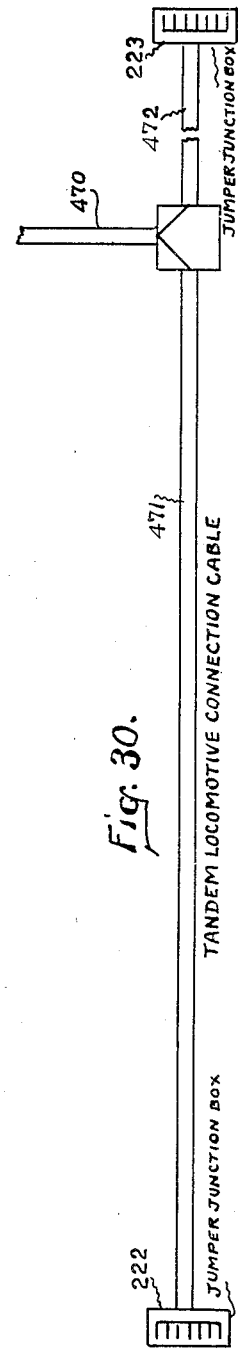
Figure 30 shows the multiple connection conduits running to the jumper boxes at each end of a locomotive to enable the control of locomotives in tandem.

When two locomotives are connected in tandem and operated from a single control station, each locomotive is equipped with a multi-conductor cable 470 terminating at each end in the jumper junction boxes 222 and 223 respectively. (Figure 30.)

*Circuit and operations in starting the Diesel engines (Figures 5, 6 and 7)*

That part of the complete circuit, which is active during the operations of starting the Diesel engines, is shown in Figure 7. The description applies equally well to the starting of either engine, but for purposes of illustration, the starting of the first Diesel engine 31 will be described at the outset. It will be assumed that all manually operated switches are open. (Figures 5, 6 and 7.)

The double-pole single-throw battery disconnecting switch 130 is first closed, likewise the control switches 143 on manual control switch 76, and likewise the first engine fuel switch 150 on the switchboard 76, the latter serving to supply electric current to the motors which furnish fuel for the first Diesel engine 31. Current is now free to flow from the battery 220 through the conduit 224 to the battery disconnecting switch 130, where the negative pole thereof is grounded. The positive circuit is directly connected to the ammeter shunt 129 adjacent thereto, whence it continues along the line 225 by way of the terminal board 131 and the conduit 226 to the control switch 143 on the switchboard 76. Passing through the latter, the line 225 joins the line 227 which passes back through the conduit 226 to and through the terminal board 131, through the conduit 228 to and through the normally-closed now-closed interlocks of the generator field contactors 122 and 123, thence along the line 229 back through the conduit 228, the terminal board 131 and the conduit 226 to the first engine starting switch 144. (Figures 5, 6 and 7.)

The first engine starting switch 144, is now closed manually and held in its closed position against the tension of a spring urging it open. When the first engine starting switch 144 is thus closed, its blade 145 connects the line 229 with the line 230. The latter passes back through the conduits 226, 231, 232, 233 and 234 to the terminal board 112, whence the same line 230 passes to and through the operating coil of the engine starting contactor switch 100. The current passing through the latter energizes it and closes its normally-open contactor, thereby causing power current to flow from the battery 220 along the line 266 through the battery switch 130, thence along the line 235 through the conduits 236 and 237 through the contactor of engine starting contactor switch 100, previously mentioned, thence along the line 238 through the conduit 239 to the first generator 34. (Figures 5, 6 and 7.)

In the presently described circuit, the generators 34 and 40 temporarily serve also as starting motors to crank the first and second Diesel engines 31 and 38, to which they are directly connected. The line 238, by the arrangement just described, admits battery current into the starting field of the first generator 34 and passes its various windings to the ground, causing the generator 34 to operate as a motor and turning the crank-shaft of the first Diesel engine 31. When the latter engine begins firing, the first engine starting switch 144 is released manually by the operator, thus de-energizing the operating coil of the engine starting contactor 100, releasing the contactor switch thereof, cutting the connection between lines 235 and 238, breaking off the flow of battery current into the starting field of the first generator 34, and accordingly causing the latter to cease operation as a motor. (Figures 5, 6 and 7.)

The manner of starting the Diesel engines by causing the generators to serve as starting motors actuated by current from the battery 220 has, therefore, been described. It will now be shown how the batteries are charged and the current therein replenished from the generators while performing their normal functions as generators driven by the Diesel engines.

*Circuit and operations in charging the batteries (Figures 5, 6 and 8 to 13)*

The circuit which is active during the charging of the battery 220 is divided, for convenience, into a series of individual hookups shown in Figures 8 to 13 inclusive. Charging the batteries is accomplished while the Diesel engines are running at idling speed only, and by either of the generators 34 or 40, as selected by the operator through the use of the selective battery charging switch 127, the latter being a single-pole double-throw knife switch. Battery charging at higher engine speeds than idling speed is prevented by the speed relay switches 240 or 241, depending upon which generator is working. These normally-closed speed relay switches 240 and 241 are mechanically connected to the generators 34 and 40 or any suitable part of the rotating engine generator assemblies, and are automatically thrown open when the rotation speed exceeds the rotation speed to which they are adjusted to open. Thus the battery charging circuit is automatically broken when the Diesel engines 34 or 40 are brought up to their normal running speeds.

The engines are, of course, operating the generators, this having been accomplished in the starting operation immediately described above. The battery switch 130, the control switches 143 and 156, and the first engine fuel switch 150 obviously remain closed. The energization of these switches has been disclosed above, and shown in the wiring diagram of Figure 7.

The selective battery charging switch 127 is now closed to select the particular generator which it is desired to utilize for charging, generator 34 being assumed to operate for this purpose. (Figures 5, 6 and 7.) With the closing of battery charging switch 127, control current passes from the control switch 156 on the switchboard 77 (which has been energized from line 225 as described above) along the line 227 to and through the closed link 159 of the first engine starting switch 157, thence along the line 242, to and through the closed link 162 of the second engine starting switch 160, there joining the line 243. The line 243 then passes through the conduits 244, 234, 233, 232, 231 and 226 to and through the closed link 149 of the second engine starting switch 147 on the switchboard 76, thence along the line 245 to and through the closed link 146 of the first engine starting switch 144, joining the line 246. (Figures 5, 6 and 8).

The line 246 then passes through the conduit 226, the terminal board 131 and the conduit 247, emerging therefrom at the control relay contactor switch 118, whence it passes through the normally-closed now-closed interlock thereof by way of the line 248 to the blade of the battery charging switch 127. Passing through this blade, the current proceeds along the line 249 into the conduit 250 to the normally-closed speed relay 240 at the first generator 34. Assuming that the Diesel engine is idling, the speed relay 240 remains closed, allowing the current to pass from the line 249 into the line 251, thence back through the conduit 250 to and through the operating coil of the battery charging contactor switch 125 to the ground. (Figures 5, 6 and 8).

The energization of the battery charging contactor switch 125 closes the normally-open interlocks thereof and causes the circuit shown in Figure 9 to become operative. Control current is now allowed to pass from the line 251 through a branch line 252 thereof to and through the now-closed interlock of battery charging contactor switch 125, thence along the line 253 through the conduit 228, the terminal board 131 and the conduits 231, 232, 233 and 234, the terminal board 112, and the conduit 254 to the normally-closed contactor of the teaser field control relay 85: here the circuit divides, one portion of the current going through the normally-closed contactor of the teaser field control relay 85 and along the line 255 through the operating coil of the separately-excited generator field contactor 122, energizing it and passing into the ground, completing the circuit. The remainder of the control current, however, continues along the line 253 through the operating coil of the generator shunt field contactor 98, energizing it and passing into the ground, also completing the circuit. (Figures 5, 6 and 9.)

The energization of the generator field contactor 122 and the generator shunt field contactor 98 closes their normally-open contactor switches, cuts out the self-excited generator field transfer resistor 86 by short circuiting its terminals (Figure 10) and allows power current to proceed from the first generator 34 along the power line 256 through the conduit 239 to but not through the contactor switch of the generator contactor 91, thence along the same line 256 to and through the now-closed contactor switch of the generator shunt field contactor switch 98, thence along the line 257 through the self-excited generator field transfer resistor 83, thence along the line 258 through the conduit 239 back to the first generator 34, where the current passes through the teaser field coils thereof to the ground, completing the circuit shown in Figure 10.

Meanwhile the above closing of the contact switch of the separately-excited generator field contactor 122 allows battery current (Figure 11) to flow from the connection of the latter at the battery switch 130 through the ammeter shunt 129, thence along the line 259 through the now-closed contactor switch of separately-excited generator field contactor 122, thence along the line 260 through the conduit 237 to and through the separately-excited generator field resistor 81, the line 261, which passes back through the conduit 239 to and through the teaser field of the first generator 34, thence to the ground beyond it, completing the circuit. In this way battery current is supplied to assist the excitation of the generator field coils and, therefore, to enable the generator to come up to its normal charging voltage in a shorter period of time than would be possible without such auxiliary excitation.

At the same time (Figure 12) the closing of the contactor switch of the battery charging contactor 125 by the above energization of its operating coil allows generator power current to pass therethrough by way of the line 256 from the first generator 34, thence from the battery charging contactor switch 125 along the line 262 through the battery charging resistor unit 113 and the line 263. One branch of the line 263 carries current through the normally-open now-closed interlock of the battery contactor switch 125 along the line 264 through the reverse current relay resistor 121 and the shunt coil 268 of the reverse current relay 119 to the ground, energizing the shunt coil and completing the circuit. The other branch of the line 263 carries current through the reverse current relay series coil 120; the now-closed contactor switch of the reverse current relay 119, the line 265, the battery fuse cut-out 128, the ammeter shunt 129, the battery disconnecting switch 130, and the line 266, back through the conduit 224 to and through the battery 220, charging the latter. From the battery 220, the current passes along the line 267 back through the conduit 224 to the battery disconnecting switch 130 and thence to the ground, completing the circuit.

In this way the battery 220 is charged by the current from the first generator 34 when the latter is driven by the first Diesel engine 31 at its idling speed.

When the battery becomes fully charged, or the voltage delivered by the generator becomes less than the battery voltage, current from the battery will tend to be forced backward. This battery current of excessive voltage passes from the battery 220 back along the line 266, the conduit 224, the battery disconnecting switch 130, the ammeter shunt 129, the battery fuse cut-out 128, the line 265, the contactor switch of the reverse current relay 119 and through the series coil 120 thereof, retracing the circuit previously described and weakening the field of the shunt coil 268. This weakening of the field of the reverse current relay shunt coil 268, which is the potential coil of the reverse current relay 119, causes the latter to release its normally-open now-closed contactor switch, breaking the circuit passing therethrough and thus preventing the drainage of current backward from the battery. (Figures 5, 6 and 12.)

The battery charging circuit is broken automatically in two more ways other than by building up of excessive voltage in the battery. The second way occurs as previously mentioned, i. e. when the first Diesel engine 31 is speeded up beyond its idling speed so that the speed relay 240 is caused to fly open and break the circuit between the lines 249 and 251, this in turn disrupting the battery charging control circuit. The third way of disconnecting the battery charging circuit occurs when either of the controller speed drums 185 or 186 is moved from its "off" position to the first series notch of the controller handle. When this is done the throttle relay switch 214 is closed mechanically, causing current to flow (Figure 13) from the line 225 through the control switch 156 on the switchboard 77, the line 227 and through the throttle relay switch 214 by way of the conduits 244, 234, 232 and 269. After passing through the mechanically-closed throttle relay switch 214, the current passes along the line 270 back through the conduit 269, the conduit 231, the terminal board 131 and the conduit 247 to and through the operating coil of the control relay contactor switch 118, energizing it and passing into the ground, completing the circuit. The energization of the control relay contactor switch 118 causes it to open its normally-closed interlock, breaking the connection between the lines 246 and 248, and accordingly de-energizing the operating coil of the battery contactor switch 125 beyond it. This causes the normally-open interlocks of the battery contactor switch 125 to fly open, breaking the connection between the lines 252 and 253 and consequently de-energizing the operating coils of the separately-excited generator field contactor switch 122 and the generator shunt field contactor switch 98. This in turn releases the main contacts of the above contactor switches 122 and 98 respectively, allowing their interlocks to return to their normal positions. In this way the battery charging control circuit is broken in a third manner. (Figures 5, 6 and 13.)

Consequently the battery charging is allowed to take place only when the Diesel engines are operating at idling speed and ceases immediately by the above described automatically controlled means when the idling speed is exceeded. The operations, described above, of bringing the Diesel engine and generator from starting speed up to idling speed and the application of the auxiliary excitation from the battery occur whenever either of the Diesel engines 31 or 39 is started, and not only when battery charging is to be performed.

*Forward movement with motors in series (Figures 5, 6 and 14 to 19)*

The circuit which remains active and the parts which are operative during the forward motion of the locomotive with the traction motors arranged in series, are shown in Figures 14 to 19 inclusive. The complete circuit is thus divided into a series of individual hookups in order to show more conveniently the sequence of operations.

The motion of the locomotive is controlled by drum type controllers of the conventional form, possessing speed drums 185 and 186 having the usual irregular contacts for series, series-parallel and reduced-field arrangement and operation of the traction motors. Associated with the controller speed drums 185 and 186 are the forward-and-reverse drums 180 and 181 also having irregularly located contact members which come into operation during the rotation of the drum and serve to make various combinations of connections between the lines joined to their contact fingers. (Figures 5 and 6.)

The operating handle of each controller speed drum 185 or 186 is mechanically interlocked with the handle of its associated forward-and-reverse drum 180 or 181 respectively, the locomotive being capable of operation only when the interlocking lever is in position. Only one interlocking lever is supplied with the locomotive and is removed therefrom when service is discontinued. To place the locomotive in service, the operator inserts the interlocking lever in the controller selected for use. For purposes of illustration, it will be assumed that the first controller 52 will be used rather than the second controller 53. (Figure 34.)

To operate the locomotive in a forward direction, the forward-and-reverse handle is moved into the "forward" position. It is, of course, assumed, as before, that the first Diesel engine and its generator are running at idling speed, and that the battery switch 130, the control switches 143 and 146, and the first engine fuel switch 150 remain closed. The starting of the Diesel engine and the energization of these switches has been previously disclosed, and shown in the wiring diagram of Figure 7.

The first controller speed drum 185 contains three different sets of circuits for connecting the traction motors in series, series-parallel or reduced-field arrangement. While these three arrangements are provided for manual operation, it is normally only necessary to throw the controller handle directly into the reduced-field position since the various contactor switches and relays will then automatically change the motor arrangements at the proper time without any necessity for attention on the part of the operator. The manual selection, however, may be used for obtaining a lower speed connection when the locomotive decelerates, if a lower speed is desired than is provided by the automatically-operated circuit. (Figures 5 and 6.)

The first and second controllers 52 and 53 are interconnected by the lines 271, 272 and 279 in the manner diagrammatically shown in Figure 14. These interconnections are variously made or broken with the line 274 in the manner described below, and these lines are variously interconnected through the drum itself.

Assuming that the switches previously mentioned are closed, and the first Diesel engine 31 is running the first generator 34 at idling speed, also that the first forward-and reverse drum 180 is in "forward" position, the operator throws the first controller speed drum 185 into its first notch, that of the series arrangement. In this position, current flows from the line 227, whose energization has previously been described, through the closed blade 152 of the first engine fuel switch 150 into the line 275. From the first engine fuel switch 150, the line 275 (Figure 15) passes through the conduits 226, 231, 232, 233 and 276, emerging at the first controller speed drum 185. The first notch thereof, set in the manner previously described, now interconnects the line 275 with the line 277, as will be seen by tracing the course of the vertical dotted lines in the controller diagram. The current now flows in the line 277 back through the conduits 276, 233, 232 and 269 to the first throttle operator 204, passing through the coil 208 thereof to the ground and completing the circuit.

Meanwhile the forward-and-reverse drum 180 in its "forward" position has interconnected the circuits 271, 273 and 279 through the drum, whereas the second forward-and-reverse drum 181 in the same position similarly connects the line 271, 272 and 279 through the drum. This, therefore, results in the line 273 of the drum 180 being connected to line 272 of drum 181, the other line 271 being common to both drums. A branch 274 goes from the line 278 into the conduit 276, and actuates the air compressor motors 62 and 63 in a manner described later. Meanwhile the line 227 continues onward from the first engine fuel switch 150 through the conduits 226, 231 and 269 to the throttle relay switch 214. The latter is closed mechanically with the closing of the first series notch of the speed drum 185, which throws in the first point 208 of the first throttle operator 204, as previously shown. The mechanical closing of the throttle relay switch 214 now permits current to flow therethrough from the line 227 into the line 270, thence through the conduits 269, 231 and 247, and the terminal board 131 to the control relay contactor switch 118, energizing the operating coil thereof and passing to the ground, completing the circuit. This energization closes the main contacts of the control relay contactor switch 118 (Figure 15), thereby allowing current to flow from the line 246, whose energization at the first engine starting switch 144 has been previously described, along the line 271 to the forward-and-reverse drum 180 through which it connects with the line 273. The latter is connected with the line 279 by the throwing of the first controller speed drum out of its "off" position. The line 279 passes into and through the conduits 276 and 234, the terminal board 112 and the conduit 280 to the reverser 102 in the first control cabinet 54, where it joins the line 281. The current proceeds along the line 281 through the normally-closed interlocks of the engine starting contactor switches 100 and 101, thence along the line 282 through the conduit 254, the terminal board 112, and the conduits 244, 234, 233, 232, 231 and 226 to the first engine fuel switch 150. (Figure 16.) Passing through the latter, the current goes along the line 283 through the same conduits, the terminal board 112 and the conduit 284 to the lower normally-closed interlock of the generator field contactor 99. Here the current passes either through the normally-closed lower interlock of the generator field contactor 99 and proceeds thence along the line 285 through the operating coil of the generator contactor switch 91, energizing the latter and passing to the ground beyond, or else it continues along the line 283 through the normally-open interlock of the generator contactor 91 which has now been closed by the energization of its operating coil above, thence through the same operating coil, continuing its energization and passing to the ground beyond. In this way the current through the line 283 is passed through the interlocks of the generator contactor 91, regardless of whether the latter is energized or not, and the operating coil thereof thus remains energized through its own interlock.

In the meantime the battery charging circuit has been broken when the control relay contactor switch 118 was energized, opening its normally-closed interlock and breaking off the connection between the lines 246 and 248. The speeding up of the engine generator in the forward motion of the locomotive would also actuate the speed relay 240 and open the battery charging circuit when the engine speed exceeded idling speed. (Figure 13.)

The "teaser" or auxiliary excitation now comes into play (Figure 17) to assist the generator 40 in now more rapidly building up its required voltage than would be possible with its normal excitation. The series motor contactor switches 93 and 95 connect the traction motors 71, 72, 73 and 74 in the series arrangement. The former controls the first generator 34, the latter the second generator 40. The line 281, while proceeding from the reverser 102 to the engine starting contactor switch 100, as previously described, connects on the way with the upper blade of the traction motor control cut-out switch 110. The current from the line 281 passes through the latter and proceeds along the line 286 to the operating coil of the series motor contactor switch 93 energizing it and passing to the ground beyond. At the same time the line 286 also carries current from the traction motor cut-out switch 110 through the upper blade of the traction motor cut-out switch 111, thence along the line 287 through the normally-open now-closed interlock of the series motor contactor switch 93, thence along the line 288 through the normally-closed upper interlock of the series-parallel motor contactor switch 96, thence along the line 289 through the upper normally-closed interlock of the series-parallel motor contactor switch 94, thence along the line 290 to the operating coil of the series motor contactor switch 95, energizing it and passing to the ground. (Figure 17.)

The above energization of the series motor contactor switch 95 and the generator contactor switch 91 closes their normally-open upper interlocks, allowing current to flow from the line 290 at the upper normally-closed interlock of the series-parallel motor contactor switch 94, thence along the lines 296 and 297 to the operating coil of the generator shunt field contactor 98, through which a portion of the current passes, energizing it and proceeding to the ground beyond. The remainder of the current continues along the line 297 through the normally-closed lower interlock of the teaser field control relay 85, thence along the line 255 through the conduit 254, the terminal board 112, the conduits 234, 233, 232 and 231, the terminal board 131, and the conduit 228 to the operating coil of the separately-excited generator field contactor 122, energizing it and passing into the ground beyond.

When the above circuits have been completely closed (Figure 17), the engine speed needs only to be increased in order to give the locomotive more power. When this is done and the generator voltage builds up to a predetermined potential (Figure 18) with the assistance of the teaser field excitation previously described, the teaser field control relay 85, which is a voltage relay, closes at the predetermined voltage to which it was adjusted, its operating coil having been energized from the line 298 leading through the teaser field relay resistor 88 to the power line 291 which in turn passes through the conduit 239 to become energized through the now-closed main contactor of the generator contactor switch 91. The energization of the teaser field control relay 85 raises its normally-closed interlocks and thus breaks the whole circuit of the separately-excited generator field contactor switch 122, which in turn removes the teaser excitation field from the first generator 34 (Figure 18).

Due to the energization of the generator contactor switch 91, the series motor contactor switches 93 and 95 and the generator shunt field contactor switch 98, the main contacts of these are closed, so that power current proceeds (Figure 19) from the first generator 34 along the line 256 through the conduit 239, through the now-closed main contactor of the generator contactor switch 91, thence along the line 291, through the now-closed main contactor of the series motor contactor switch 93, thence along the line 292 through the conduits 293, 294 and 295 to the windings of the first traction motor 71. Meanwhile generator field excitation current has proceeded from the line 256 along the branch line 256 from the generator contactor switch 91 through the now-closed main contactor of the generator shunt field contactor switch 98 (which is now short-circuiting the terminals of the self-excited generator field transfer resistor 86), thence through the self-excited generator field transfer resistor 83 and finally by the line 258 by way of the conduit 239 through the field windings of the first generator 34 to the ground, completing the field circuit. (Figure 19.)

Figure 19:
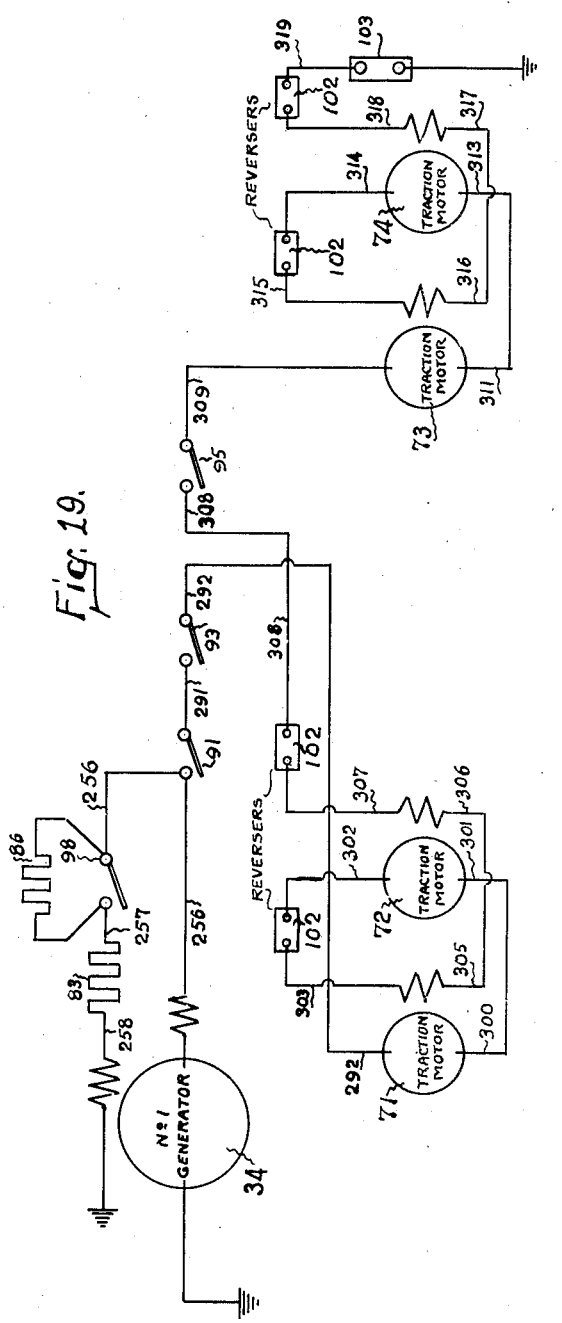
Figure 19 is an individual wiring diagram showing the power current circuit of the locomotive with the motors arranged in series.

To return to the first traction motor 71, to which the power line 292 has already been traced, the current thereof passes through the armature windings of the motor and continues by the line 300 back through the conduit 295 to join the line 301, thence passing through the armature windings of the second traction motor 72 and out by way of the line 302 (Figure 19). The line 302 proceeds onward through the conduit 294 to the upper blade of the reverser 102, from the opposite side of which it passes along the line 303 back through the conduits 304, 294 and 295 to and through the field coils of the first traction motor 71, then along the line 305 through the conduit 295 to join the line 306 and pass through the field coils of the second traction motor 72. Beyond this point the line 307 carries the current back through the conduits 294 and 293 to and through the second blade of the reverser 102, thence by the line 308 to and through the now-closed main contactor of the series motor contactor switch 95, thence by the line 309 back through the conduits 293, 294 and 310 to the third traction motor 73. Passing through the armature windings thereof, the current proceeds along the line 311 through the conduit 312 to join the line 313 and thence pass through the armature windings of the fourth traction motor 74. Beyond this point the current proceeds by the line 314 back through the conduits 312, 310, 294 and 304 to and through the third blade of the reverser, thence by the line 315, back through the conduits 293, 295 and 310 to and through the field windings of the third traction motor 73, thence by the line 316 through the conduit 312 to join the line 317 and pass through the field windings of the fourth traction motor 74. Beyond this point the current continues along the line 318 back through the conduits 312, 310, 294 and 293 to and through the fourth blade of the reverser 102, thence along the line 319 through the traction motor ammeter shunt 103 to the ground. In the above manner the motors are connected in series and the power current flows through their various windings. (Figures 5, 6 and 19.)

Rotating the controller speed drum 185 (Figures 6 and 34) to the second series notch thereof throws out the line 277 and the coil 208 of the throttle operator 204, leaving the coil 206 connected to the line 275 by way of the line 385, the other previously mentioned connections remaining unchanged. With the controller speed drum 185 advanced to its third series notch, the coils 206 and 208 of the throttle operator 204 are connected to the line 275 through the lines 385 and 277 respectively. In the fourth series notch thereof, the coils 207 and 208 of the throttle operator 204 are connected to the line 275 through the lines 386 and 277 respectively, whereas in the fifth series notch the coils 206 and 207 are connected to the line 275 by way of the lines 385 and 386 respectively. Regardless of the series notch in which the controller speed drum 185 is placed, however, the other connections remain the same as has been previously described for the drum 185 in the first series notch. (Figures 5, 6 and 19.)

Immediately above the lowest portion of the first controller speed drum 185, (Figures 6 and 34) whose action in interconnecting the various coils of the first throttle operator 204 has just been described, is a second portion of similar form. This second portion of the first controller speed drum performs similar interconnections of the coils 211, 212 and 213 in the second throttle operator 205, through the lines 387, 388 and 389 connecting these coils to the contact fingers engaging the second portion of the first controller speed drum 185. This second portion controls the connections of the second throttle operator 205 for the second engine 38 and its generator 40 in the same manner as the lower portion of the first controller speed drum 185 controls the connections of the first throttle operator 204 for the first engine.

*Forward movement with motors in series-parallel (Figures 19, 20, 21, 31 and 34)*

To shift from a series to a series-parallel arrangement of the forward traction motors 71, 72, 73 and 74 (Figure 20), the controller speed drum 185 is now moved to the first "series-parallel" notch thereof. (The forward-and-reverse drum 180, of course, remains in its forward position.) This connects the line 320 with the line 278 from the forward-and-reverse drum 180, whose energization has been described previously. (Fig. 34.)

Figure 31:
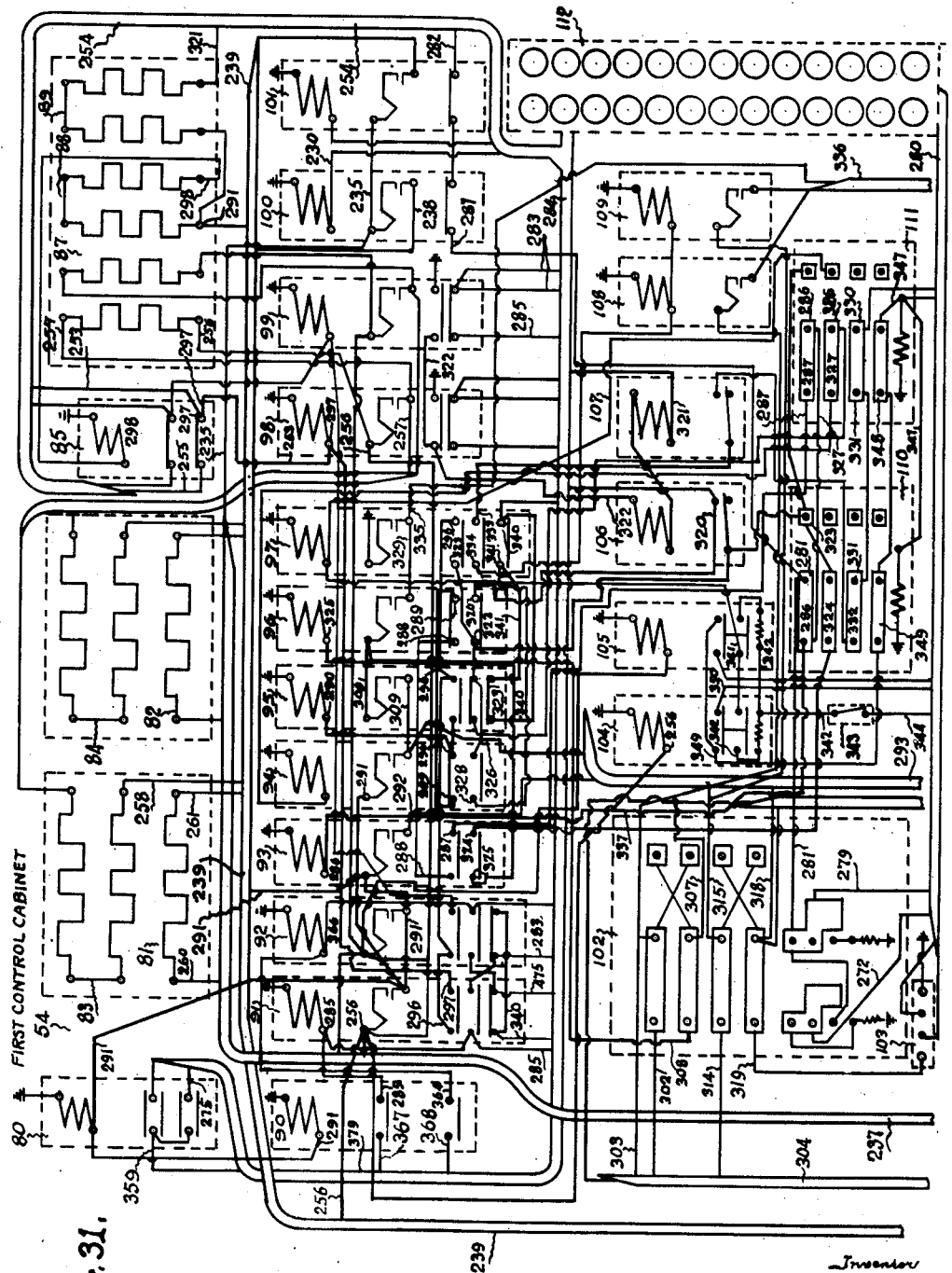
Figure 31 is a wiring diagram of part of the electrical circuit shown in Figure 5, enlarged to show the contents and connections of the first control cabinet.
Figure 32:
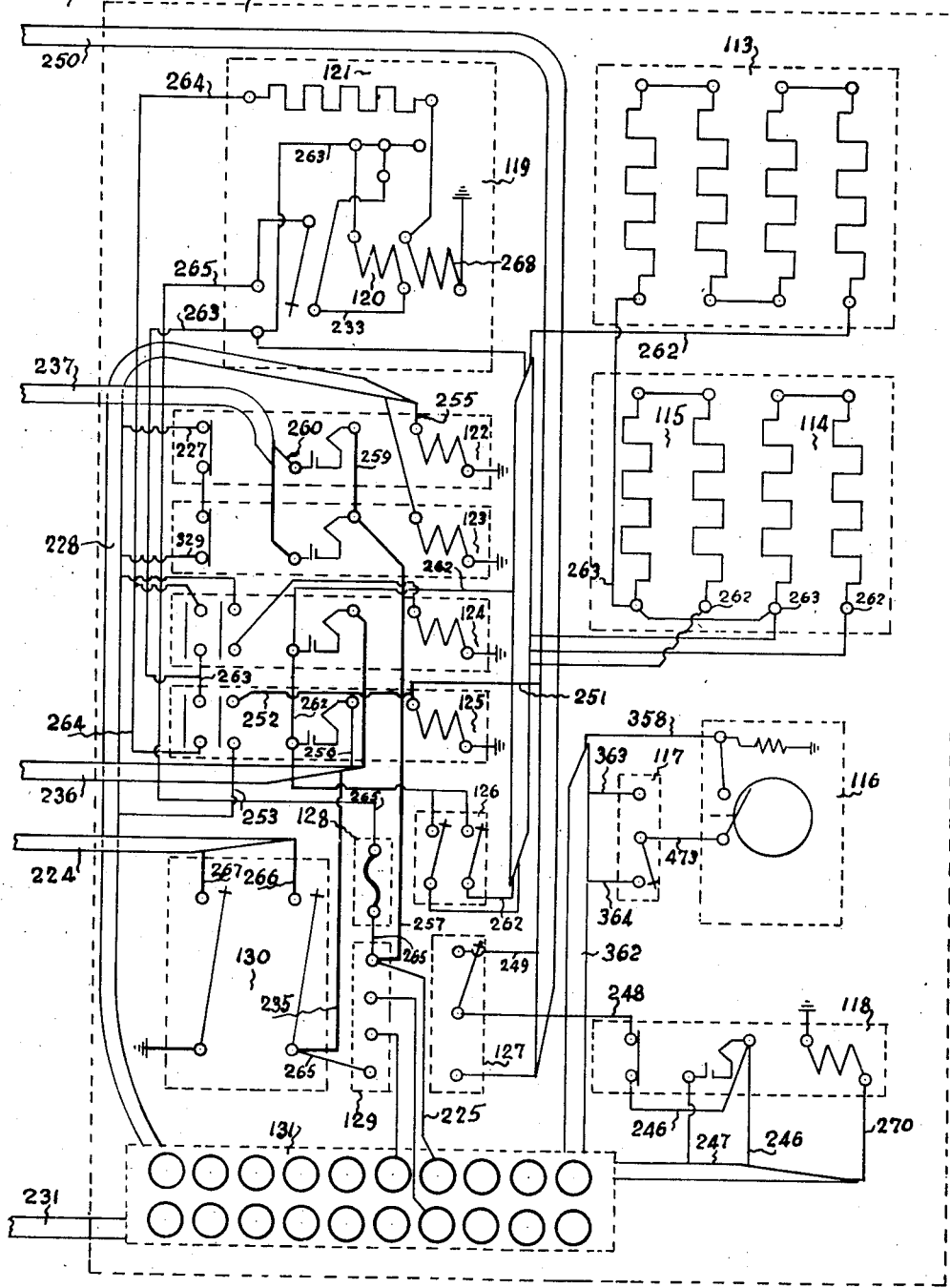
Figure 32 is a wiring diagram of part of the electrical circuit shown in Figure 6, enlarged to show the contents and connections of the second control cabinet.

The operating coil of the generator contactor switch 91 remains energized through the line 283 and the normally-open but now closed interlock of generator contact switch 91, as previously described. The operating coils of traction motor transfer relay 106 and field shunting control relay 107 are traversed by power current flowing from the first generator 34 along the line 256 through the conduit 239 through the main contactor of the generator contactor switch 91, thence by the line 291 through the conduit 239 to and through the traction motor transfer and field shunting relay resistor 89, thence by the line 321 through the conduits 254 and 284 to and through the operating coils of the traction motor field shunting control relay 107 and the traction motor transfer control relay 106, thence by the line 322 through the normally-open but now-closed upper interlock of the generator shunt field contactor switch 98 and thence to the ground, completing the circuit. (Figure 31.)

The mere passage of current in the manner above specified will not alone actuate the transfer control relay 106 and the field shunting control relay 107, since these are voltage relays adjusted to close the circuit when a predetermined voltage of the generator has been reached in the line passing therethrough. When the locomotive gains a certain speed through the building up of the generator voltage, and the current consequently drops, this predetermined voltage is reached. At this point the operating coil of the traction motor transfer control relay 106 is sufficiently energized to close its normally-open interlock, it being so pre-adjusted as to become operative at that voltage. When this occurs, current passes along the line 320 from the first controller speed drum 185 through the conduits 276 and 234, the terminal board 112 and the conduit 284 to and through the relay switch of the traction motor transfer control relay 106. Beyond this the current continues along the line 323 through the second blade of the traction motor cut-out switch 110, thence by the line 324 to and through the normally-open but now-closed lower interlock of the series motor contactor switch 93, whose coil has remained energized. Beyond this the current proceeds along the line 325 to and through the operating coil of the series-parallel motor contactor switch 96, energizing it and passing to the ground, thus completing the circuit. The line 323 in this manner becomes the control circuit for the series-parallel motor connections.

The above energizing of the operating coil of the series-parallel motor contactor switch 96 closes its main contactor, opens its normally-closed upper interlock which joins the lines 288 and 289, and also closes its normally-open lower interlock which additionally connects the line 320 with the line 323, thus shunting the previous connection made through the traction motor tranfer control relay 106. If the latter should now become inoperative through a dropping of the line voltage, the connection of the line 320 to line 323 would in this manner remain unbroken. The opening of the normally-closed upper interlock of the series-parallel motor contact switch 96 by cutting the connection between the lines 288 and 289 de-energizes the operating coil of the series motor contactor switch 95, which the current reaches through the normally-closed upper interlock of the series-parallel motor contactor switch 94 and the line 290 (Figure 20).

The de-energization of the last-mentioned coil allows its upper normally-open interlock to open, breaking the connection between the lines 290 and 296. This de-energizes the generator shunt field contactor 98 by thus breaking the energization connection thereof through the normally-closed upper interlock of the series-parallel motor contactor switch 94 to the line 289, thence through the normally-closed interlock of the series-parallel motor contactor switch 96 to the line 288, thence through the normally-open but now-closed upper interlock of the series motor contactor switch 93 by way of the line 287 through the upper blade of the traction motor cut-out switch 111. Beyond this the circuit continues through the line 286 to and through the upper blade of the traction motor cut-out switch 110, thence by the line 281 through the reverser 102 to the line 279. The latter passes through the conduit 280, the terminal board 112, and the conduits 234 and 276 to its energization point at the forward-and-reverse drum 180.

This de-energization of the generator shunt field contactor switch 98 reduces the generator voltage by cutting in the series resistor 86 whose terminals are otherwise short-circuited when the former is energized. The de-energization of the series motor contactor switch 95 breaks the series motor circuit by the opening of the main contactor thereof, thus severing the connection between the power lines 308 and 309 (Figure 19). The de-energization of the series motor contactor 95 also allows its normally-closed middle interlock to close, thus joining the line 326 with the line 323 which in turn receives current from the line 320 by way of the relay switch of the transfer control relay 106, the line 320 being energized at the first controller speed drum 185 from the forward-and-reverse drum 180 in the manner previously set forth. By the closing of the middle interlock of the series motor contactor 95 through its de-energization, current now flows along the line 326 to the traction motor cutout switch 111, thence through the second blade thereof and along the line 327 to and through the operating coil of the series-parallel contactor switch 94, energizing it and passing to the ground, thus completing the circuit.

The above energization of the operating coil of the series-parallel contactor switch 94 closes its normally-open lower interlock and thereby joins the line 328 with the line 323. Current is thus allowed to pass from the line 320, whose energization at the first controller speed drum 185 has been described above, through the normally-open but now-closed lower interlock of the series-parallel contactor switch 96, thence through the line 323 by way of the normally-open but now-closed lower interlock of the series-parallel contactor switch 94, thence along the line 328 to and through the operating coil of the transfer resistor contactor switch 97, energizing it and passing to the ground, thus completing the circuit.

Through the energization of the series-parallel contactor switches 96 and 94 and the transfer resistor contactor switch 97, the contactors thereof close (Figure 21), allowing power current to proceed from the first generator 34 along the line 256 through the conduit 239 to and through the contactor of the generator contactor switch 91, where it divides into two branches 291, one for each pair of traction motors. The branch 291 for the traction motors 71 and 72 carries current through the main contactor of the series motor contactor switch 93, along the line 292 through the conduits 293, 294 and 295 to and through the armature windings of the first traction motor 71. Beyond the first traction motor 71, the power current proceeds along the line 300 through the conduit 295 to join the line 301 leading through the armature windings of the second traction motor 72. From the second traction motor 72, the power current proceeds by the line 302 back through the conduits 294 and 304 to and through the first blade of the reverser 102, thence along the line 303 back through the conduits 304, 294 and 295 to and through the field windings of the first traction motor 71, thence by the line 305 thereof through the conduit 295 to join the line 306 to and through the field windings of the second traction motor 72. (Figure 21.) Beyond the second traction motor 72, the power current passes along the line 307 through the conduits 294 and 293 to and through the second blade of the reverser 102, thence along the line 308 to and through the closed main contactor of the series-parallel contactor switch 96, thence by the line 329 to and through the now-closed main contactor of the transfer resistance contactor switch 97 to the ground, completing the series-parallel circuit for the first and second traction motors 71 and 72.

From the main contactor of the generator contactor switch 91 the other branch 291 of the power line runs to and through the now-closed main contactor of the series-parallel contactor switch 94, thence by the line 309 through the conduits 293, 294 and 310 to and through the armature windings of the third traction motor 73. (Figure 21.) Beyond this the power current runs along the line 311 through the conduit 312 and the line 313 to and through the armature windings of the fourth traction motor, thence along the line 314 through the conduits 312, 310, 294 and 304 to and through the third blade of the reverser 102. Beyond this the power current runs along the line 315 through the conduits 293, 294 and 310 to and through the field windings of the third traction motor 73. Beyond this the power current continues along the line 316 through the conduit 312 by the line 317 to and through the field windings of the fourth traction motor 74. Beyond the latter the power current flows along the line 318 through the conduits 312, 310, 294 and 293 to and through the fourth blade of the reverser 102, beyond which the current flows along the line 319 through the traction motor ammeter shunt 103 to the ground, completing the circuit. (Figure 21.)

Thus by the above operations, each two motors are connected in series with each other, but joined in parallel with the generator and the other paired unit of two series-connected motors.

Meanwhile, the operating coils of the generator shunt field contactor switch 98 and the separately-excited generator field contactor 122 have been energized by current passing through the normally-open but now-closed (Fig. 20) upper interlock of the transfer resistor contactor switch 97 by way of the line 323 joining the line 296, thence to and through the normally-open but now-closed upper interlock of the generator contactor switch 91 to the line 297, thence to and through the operating coil of the generator shunt field contactor switch 98, energizing it and passing to the ground. Just before reaching the operating coil of the latter, the line 297 carries current to and through the normally-closed and now-closed lower interlock of the teaser field control relay 85, thence along the line 255 through the conduit 254, the terminal board 112, the conduits 234, 233, 232 and 231, the terminal board 131, and the conduit 228 to the separately-excited generator field contactor switch 122 in the second control cabinet 55, thence to the ground. The latter introduces battery current to assist the field excitation of the generators and enable them to build up to the desired voltage in a shorter period of time. (Figure 20.)

When the generator voltage becomes built up sufficiently to reach the predetermined set voltage of the teaser field control relay 85, the latter becomes operative and opens its lower interlock, breaking the circuit between the lines 297 and 255 and thus de-energizing the separately-excited generator field contactor switch 122 (whose energization has just been described) and removing the teaser field excitation from the circuit.

The locomotive is now under power and moving forward in a series-parallel connection but without the auxiliary or teaser field excitation of the generators.

*Forward movement with motors in reduced-field arrangement (Figures 5, 6, 22 and 23)*

If it is desired to operate the motors in a reduced-field arrangement, the controller speed drum 185 is moved to the reduced-field notch, whereupon the line 330 becomes connected to the line 278 and, therefore, energized through the latter from the forward-and-reverse drum 180, the energization of the line 274 having been previously described (Figure 22). The line 330 now becomes the operating control line for the reduced-field operation.

When the locomotive attains a certain predetermined speed as indicated by a certain generator voltage, the coil of the field shunting control relay 107 becomes sufficiently energized to trip its switch. Current is then free to flow from the forward-and-reverse drum 180 along the lines 274 and 330 through the conduits 276 and 234, the terminal board 112 and the conduit 280 to and through the third blade of the traction motor cut-out switch 111. Beyond this the current flows along the line 331 to and through the third blade of the traction motor cut-out switch 110, thence along the line 332 to and through the normally-open but now-closed relay switch of the field shunting control relay 107. Beyond this the current passes along the line 333 to and through the normally-open but now-closed middle interlock of the transfer resistor contactor switch 97, thence along the line 334 to and through the operating coils of the traction motor field shunting contactors 108 and 109, energizing them and passing to the ground, completing the circuit (Figure 22).

The energization of the field shunting contactor switches 108 and 109 closes their main contactors for the passage of power current. (Figure 23.) The closing of the main contactor of the transfer resistance contactor switch 97 shunts the series-connected resistors 203 and 201 into the circuit around it, so that current passes from one terminal of the main contactor of the transfer resistor contactor switch 97 by way of the line 335 through the conduit 337, thence through the resistor 203, thence through the resistor 201 and thence to the ground, completing the circuit. The other side of the main contactor of the transfer resistor contactor switch 97 is likewise grounded. The closing of the main contactor of the field shunting contactor switch 108 shunts the resistor 202 around the field coils of the paired traction motors 71 and 72, by way of the lines 336 and 299. Closing the main contactor of the field shunting contactor switch 109 similarly shunts the resistor 200 around the field coils of the paired traction motors 73 and 74, by way of the lines 338 and 339.

*Operation with second engine or both engines*

Hitherto it has been assumed, merely for purposes of illustration, that the first Diesel engine 31 and its generator 34 were alone utilized in operating the locomotive. The second engine 38 and its generator 40 may also be used alone for this purpose, or both engines may be used simultaneously. The circuit for the second engine and generator is complete in itself and is substantially the same as that of the first, with the exception that a duplicate set of contactor switches is occasionally used. Its mode of operation, however, is exactly the same as that of the first engine and generator. If both engines are running simultaneously, both sets of contactor switches are simultaneously used, where such duplicate sets are provided. Thus, for example, where the circuit for the first engine 31 and generator 34 includes the generator contactor switch 91, that for the second engine 38 and generator 40 instead includes the similar generator contactor switch 92. Other duplicate parts in the first control cabinet 54 are the generator shunt field contactor switches 98 and 99, the engine starting contactor switches 100 and 101, the time over-current relays 104 and 105. Similarly, duplicate parts in the second control cabinet 55 include the separately-excited generator field contactor switches 122 and 123 and the battery charging contactor switches 124 and 125.

It will presently be seen that the second engine 38 and its generator 40 can be automatically brought into operation and made a part of the circuit without any attention on the part of the operator. The second engine and generator may also be used to charge the battery 220 in the same manner as was the first.

*Automatic overload starting and cut-in of second engine (Figures 5, 6 and 24)*

When a single engine and generator are running, and such an overload develops that these become incapable of handling it, provision is made for automatically starting and cutting in the second engine and generator. It will be assumed, for purposes of illustration, that the first engine 31 and its generator 34 are running, with the motor connections in series-parallel or reduced-field, and that the locomotive is pulling a train up a long steep grade. As the train slows down because of the insufficiency of power, the voltage in the generator line drops and the amperage accordingly increases.

After the amperage of the current has risen and has remained above a predetermined amount for a certain predetermined length of time, the operating coil of the time over-current relay 104, which has been continually energized by power current flowing through it to the ground from the generator along the line 256 (Figure 24), becomes operative and closes its two normally-open interlocks. It will be observed that the usual relationship of the contactor switches is reversed: instead of the control current flowing through the operating coil and the power current flowing through the contactor switch or interlocks, the power current here flows through the operating coil and the control current through the interlocks.

With the interlocks of the time over-current relay 104 closed in the above manner, control current is free to flow from the first engine fuel switch 150, (Figures 5, 6 and 24) which has been energized as previously explained, along the line 283 through the conduits 226, 231, 232, 233, 234 and 244, the terminal board 112, and the conduit 284 to and through the normally-closed and now-closed lower interlock of the generator contactor switch 92, thence by the line 340 to but not through the normally-closed and now-open lowest interlock of the generator contactor switch 91, instead continuing along the line 340 through the conduit 284 to and through either the normally-open lowest interlock of the transfer resistor contactor switch 97 if the latter is energized to close it, or else through the normally-closed lowest interlock of the series motor contactor switch 95 if the latter is not energized: thus control current will pass from the line 340 into the line 341 by either of the above routes as may be available at the time. The control current continues along the line 341 to and through the normally-open lower interlock of the time over-current relay 104 which has just been closed by the actuation of its operating coil, as described above, resulting from an excess amperage over an excess period of time. The control current continues thence along the line 342 through the coil of the pneumatically operated plunger of the time over-current relay 104, this plunger acting to hold the latter's interlock in place if its relay coil has become inoperative. The current continues along the line 342 through a single-pole single-throw knife switch 343, thence along the line 344 through the conduit 280, the terminal board 112, and the conduits 234 and 276, emerging at the first controller speed drum 185 which has been assumed to be in use. Since the forward-and-reverse drum 180 is not in its "off" position, the normally-open interlocks 195 and 196 above it are closed, and the control current, therefore, flows therethrough from the line 344 thence along the line 345 through the operating coil of the electro-pneumatic valve unit 193, thence into the ground. (Figure 24.) When the operating coil of the electro-pneumatic valve unit 193 is thus energized, the air-operated controller handle ratchet quadrant 191 which locks the controller speed drum 185 in position against the pull of a spring contained in the electro-pneumatic shifter 187 mechanically connected to the controller speed drum 185 (Figure 5), is dropped out of its locking position and the controller speed drum 185 is then free to be returned to its "off" position mechanically by the electro-pneumatic shifter 187 under the urge of its previously mentioned spring.

When the controller speed drum 185 thus reaches its "off" position, (Figures 5 and 6) all of the power contactor switches are de-energized, such as the generator contactor switch 91, the series motor contactor switch 93, the series-parallel contactor switches 94 and 96, the transfer resistor contactor switch 97, the generator shunt field contactor switch 98 and the separately-excited generator field contactor switch 122. Accordingly, the above-mentioned control current now passes from the line 340 to the line 341 through the normally-closed and now-closed lowest interlock of the series motor contactor switch 95 rather than through the normally-open and now-open lowest interlock of the transfer resistor contactor switch 97, the latter interlock having been previously closed and then opened by the shifting of the controller speed drum back to its "off" position.

When the controller speed drum 185 thus returns to its "off" position, the interlocks above it and connected to the air-operated controller handle ratchet quadrant 191 are closed, (Figures 5, 6 and 24) allowing the control current to pass from the line 345 through the lower interlock thereof into the line 346, and thence to and through the lower terminal plate of the controller speed drum 185 where it joins the line 347. The line 347 returns through the conduits 276 and 234, the terminal board 112 and the conduit 280 to and through the operating coils of the traction motor cut-out switches 110 and 111, energizing them and passing into the ground: this energization throws the switches associated therewith into their closed positions and thus insures all motors being placed on the power circuit.

The line 347 before passing through the operating coils above-mentioned, (Figure 24) also proceeds by a branch 347 to and through the lowest blade of the traction motor cut-out switch 111, thence by the line 348 to and through the lowest blade of the traction motor cut-out switch 110, thence along the line 349 to and through the normally-open but now-closed upper interlock of the time over-current relay 104, thence along the line 350 through the conduit 280, the terminal board 112 and the conduits 234 and 276, emerging to join the line 351 at the normally-closed and now-closed sliding contact switch of the electro-pneumatic fuel and starting switch operator 170 on the automatic control switch board 77. (Figure 34). Passing through the above-mentioned contacts, the control current continues through the line 351 to the ground by way of the operating coil of the electro-pneumatic valve unit 172, which regulates the admission of compressed air to the fuel and starting switch operator 170. The energization of the operating coil of the electro-pneumatic valve unit 172 actuates the fuel and starting switch operator 170 by admitting compressed air to its cylinder, and the latter then mechanically closes the second engine fuel switch 163 and temporarily closes the second engine starting switch 160. As the piston of the fuel and starting switch operator 170 nears the end of its stroke, the separate circuit thereof between the lines 350 and 351 is broken by the mechanical parting of its normally-closed sliding contacts, thus de-energizing the operating coil of the electro-pneumatic valve unit 172 and thereby shutting off the supply of air to the cylinder of the fuel and starting switch operator 170. The piston of the latter is then urged backward by its compression spring as the air leaks gradually out of the cylinder, so that the piston moves backward slowly with a dashpot action, causing the second engine starting switch 160 to be held in its closed position long enough to permit the second engine 38 to be started and brought up to its idling speed.

When the piston of the fuel and starting switch operator 170 has completely returned to its position of rest, its sliding contacts re-engage. (Figures 5 and 34). This enables current of the operating circuit of the second engine 38 to pass from the line 227, which has been energized as previously described, through the second engine fuel switch 166 along the line 352 through the last-mentioned sliding contacts, joining the line 353. (Figure 24). The line 353 then carries the control current back through the conduits 244, 234 and 276 to the first controller speed drum 185, where it joins the line 354 across the upper terminal plate of the first controller speed drum 185. The line 354 then carries the control current through the normally-open but now-closed upper interlock 195 above the forward-and-reverse drum 180, in the same manner as previously described in the joining of the lines 344 and 345 through the lower interlock thereof. Beyond this the current continues along the line 355 through the normally-open but now-closed upper interlock associated with the air-operated controller handle ratchet quadrant 191 and thence along the line 356, energizing the operating coil of the solenoidal valve operator 189 and lifting the needle valve rod thereof. (Figure 34). This permits air to enter the pneumatic cylinder 190, raising the needle valve rod attached to its piston against the action of a coil spring therein. This now permits air to be admitted to the electro-pneumatic shifter 187, moving its piston so as to return the first controller speed drum to the series-parallel position from which it had been displaced by the dropping out of the air-operated controller handle ratchet quadrant 191 and the spring of the electro-pneumatic shifter 187. The previously de-energized power contactor switches are now re-energized, together with the generator contactor switch 92 and the separately-excited generator field contactor switch 123. Meanwhile the air-operated controller handle ratchet quadrant 191 again drops into its locking position, holding the first controller speed drum 185 in its series-parallel position.

The above circuits 346 to 347 and 353 to 354 are broken when the controller speed drum 185 is moved out of its "off" position, de-energizing the solenoidal valve operator 189 and allowing the valve rod thereof to drop. (Figure 34). This cuts off the air supply to the pneumatic cylinder 190, permitting its piston and valve-rod to move slowly downward, impelled by its spring but retarded by its dash-pot action due to the slow leakage of air therefrom. The time lag thus created prolongs the returning of the speed drum 185 until all motor connections have been made. When the air has leaked completely out of the cylinder 190, the valve rod thereof comes to rest, closing the air intake pipe of the controller drum shifter 187 and permitting its piston and shifter arm to return to the positions shown in Figure 34. As the circuit of the speed drum shifter 187 is completed only by the action of the time overcurrent relay 104, the controller speed drums 185 and 186 are manually operable.

The knife switch 343 serves merely to enable the cutting out of the automatic motor cut-in circuit in case all of the traction motors are not operative.

Where the second engine 38 has been running and the overload with its consequent over-current cuts in the first engine 31, the operation thereof is similar to that described above, except that the time over-current relay 105 and the fuel and starting switch operator 169 are used instead of their equivalents 104 and 170 respectively.

*Automatic under-load cut-out of one engine (manually selected) (Figures 5, 6 and 25)*

Figure 25:
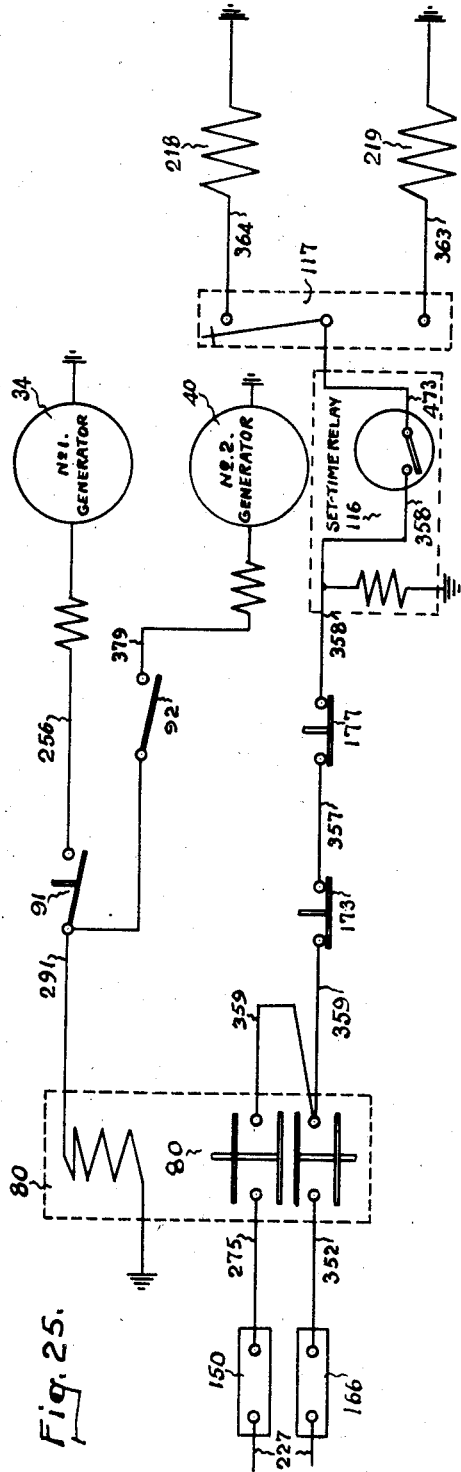
Figure 25 is an individual wiring diagram showing the automatic underload cut-out of one engine, manually selected.

When the two engines are both operating, and an under-load develops and persists over a predetermined period of time, such as when the locomotive is going down a grade, the above-entitled circuit becomes operative to remove one of the engines from the circuit and stop it, leaving a single engine to handle the reduced load (Figure 25). This under-load cut-out circuit operates automatically, but may be rendered inoperative by the use of the selective engine under-load cut-out switch 117 located in the second control cabinet adjacent to the control relay 118. The functioning of the above circuit may also be prolonged by the periodic opening of either of the momentary break contact switch 173 or 177 which are placed on the first and second instrument panels 78 and 79 respectively, within easy reach of the operator. When either of these switches is pressed by the operator, the circuit to the set-time relay 116 in the second control cabinet 55 is opened, thereby breaking the circuits 357, 358 or 359 to the set-time relay, causing it to return to zero setting, the line 358 energizing the operating coil of the set time relay 116, as will appear later.

The time under-current relay 80 in the upper corner of the first control cabinet 54 controls the circuit for the automatic under-load cut-out of one of the two engines (Figures 5 and 31). Power current flows through either or both main contactors of the generator contactor switches 91 and/or 92 to the line 291, thence to and through the operating coil of the time under-current relay 80, energizing it and passing to the ground beyond it. When the trailing load power demand of the locomotive drops below and remains below a predetermined set value for a predetermined length of time, the coil of the time under-current relay 80 becomes sufficiently energized by the current thus flowing through it in such a manner as to close its normally-open interlocks. When these close, control current is free to flow from the first engine fuel switch 150 and the second engine fuel switch 166 by way of the lines 275 and 352 respectively, to and through the upper and lower normally-open but now-closed interlocks of the time under-current relay 80.

Beyond the time under-current relay 80 (Figures 25 and 31), the two lines 275 and 352 continue in the common line 359. The current in the line 359 proceeds in this line through the conduit 284, the terminal board 112, and the conduits 234 and 360 to and through normally-closed break contact switch 173 on the first instrument panel 73, thence by the line 357 through the conduits 360, 233, 232 and 361 to and through the second break contact switch 177 on the second instrument panel 79, this being likewise a normally-closed push button type switch within easy reach of the operator. Beyond the above switch 177, the current passes along the line 358 through the conduits 361 and 231, the terminal board 131 and the conduit 362 to and through the operating coil of the set-time relay 116, energizing it and passing to the ground beyond (Figure 25). Just prior to entering the last-mentioned operating coil, the line 358 branches off and enables control current to pass through the normally-open but now-closed relay switch of the set-time relays 116 and 473 to the manually operated selective engine under-load cut-out switch 117, thence into the line 363 or 364, depending on the engine selection made by the switch 117. As current operates the coil of the relay 116, the time mechanism of the relay 116 is set in motion and after a set time delay, the contacts of the relay 116 close and circuit passes to the switch 117. Assuming that the switch 117 has been thrown to connect the line 473 with the line 364, the control current will then flow therethrough by way of the conduit 362, the terminal board 131, and the conduits 231 and 269 to and through the operating coil of the fuel cut-off valve 218 governing the first engine 31. If the switch 117 is thrown in the opposite direction, the control current proceeds similarly by way of the line 363 through the conduit 362, the terminal board 131 and the conduits 231, 232 and 365 to and through the operating coil of the second engine fuel cut-off valve 219. The energization of the operating coils of either the first or second fuel cut-off valve 218 or 219 causes the engine thereof to cease operation, leaving only one engine working (Figure 25).

*Overload maximum engine speed control (Figures 5, 6 and 26)*

Figure 26:
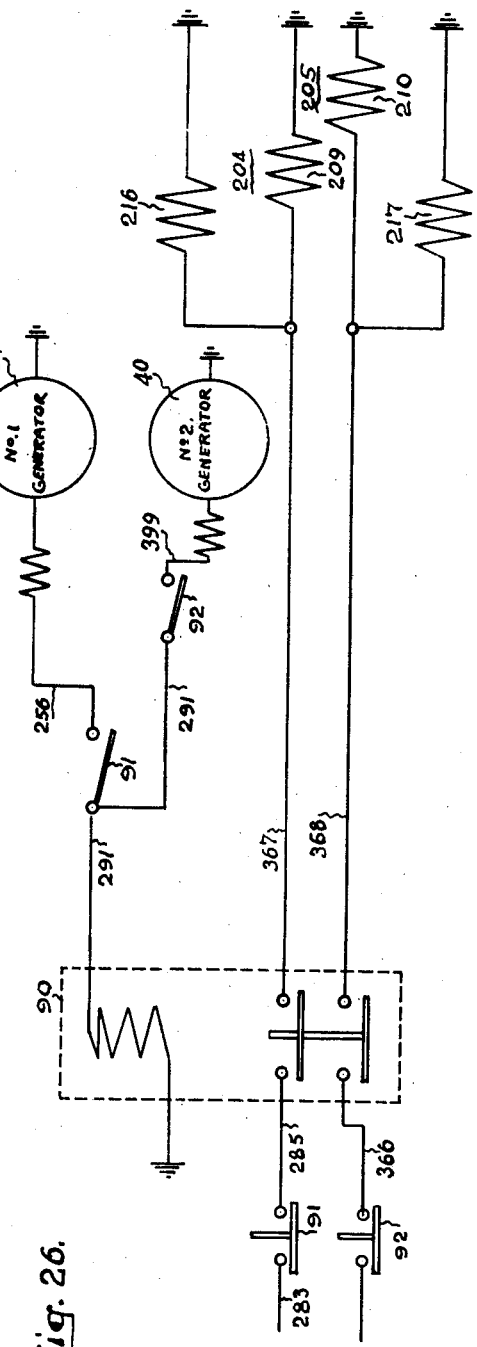
Figure 26 is an individual wiring diagram showing how the overload maximum engine speed control operates to raise the engine speed when the power circuit current has exceeded a certain amperage for a fixed length of time.

The overload maximum engine speed control circuit serves to allow the engine speed to be raised above the ordinary set running speed after the power current has reached and remained above a predetermined amperage for a predetermined period of time (Figure 26). This circuit is regulated by the time overload governor current relay 90 whose operating coil is energized by power current flowing through it along the line 291 from either of the main contactors of the generator contactor switch 91 or 92, in a similar manner to the energization of the time under-current relay 80, described above.

When an excess-amperage current has passed through the operating coil of the time overload current governor relay 90 above the set amperage and beyond the set time, the coil thereof is caused to close the interlock switches associated with it. (Figure 26). Control current is then free to flow from the generator contactor switches 91 and/or 92 by the lines 285 and/or 366 to and through the upper and/or lower normally-open interlocks of the time overload current governor relay 90. The first-mentioned circuit controls the first engine 31, whereas the last-mentioned circuit controls the second engine 38.

Beyond the interlocks of the time overload over-current governor relay 90, the lines 367 and 368 conduct current from the lines 285 and 366 respectively. The line 367 passes through the conduit 284, the terminal board 112, and the conduits 234, 232 and 269 to the first throttle operator 204, where a part of the current passes through the coil 209 thereof to the ground, and the remainder passes through the coil of the first electro-pneumatic engine governor lifter 216 to the ground. (Figure 26).

Similarly, beyond the lower interlock of the time overload current governor relay 90, the line 368 carries current through the conduit 284, the terminal board 112 and the conduits 234, 233 and 365 to the second throttle operator 205, where a portion of the current passes through the coil 210 thereof to the ground, and the remainder passes through the coil of the second electro-pneumatic governor lifter 217 to the ground. With the first and/or second electro-pneumatic engine governor lifters energized in the above manner the governor is thereby automatically lifted to allow the engine or engines to rotate more rapidly and at the same time the throttle is automatically opened wider to enable it or them to perform this more rapid rotation. (Figure 26).

*Forward-and-reverse drum safety lock (Figures 5, 6, 9, 29 and 34)*

To prevent plugging and burning up of the motors by accidentally reversing them while the locomotive is in motion, a safety device is optionally provided whereby the forward-and-reverse drums 180 and 181 are automatically locked in position until the locomotive comes to rest. To accomplish this purpose, a forward-and-reverse lever lock-out relay 182 is operatively connected to one of the parts of the locomotive which rotates during its forward or rearward motion, such as an axle. When the axle rotates as the locomotive is in motion, the lock-out relay 182 is thereby closed, allowing control current to pass from the control switch 143 or 156 through the line 227 by way of the conduits 244, 234, 232 and 269 or the conduits 226, 231 and 269 to and through the now-closed lock-out relay 182, thence along the line 369 back through the previously mentioned conduits to the forward-and-reverse drums 180 and 181, where the current passes through the operating coils of the forward-and-reverse lever lock-outs 183 and 184 actuating the latter to lock the forward-and-reverse levers and prevent the drums thereof from being shifted while the locomotive is moving. When the locomotive stops and the axle likewise stops moving, the contact members of the lock-out relay 182 fly open, breaking the circuit, de-energizing the operating coils of the forward-and-reverse lever lock-outs 183 and 184, releasing the locking members thereof and allowing the forward-and-reverse levers themselves to be shifted manually as desired. (Figures 5, 6, 29 and 34).

*Operation of the air compressor motors (Figures 5, 6, 27 and 33)*

Figure 27:
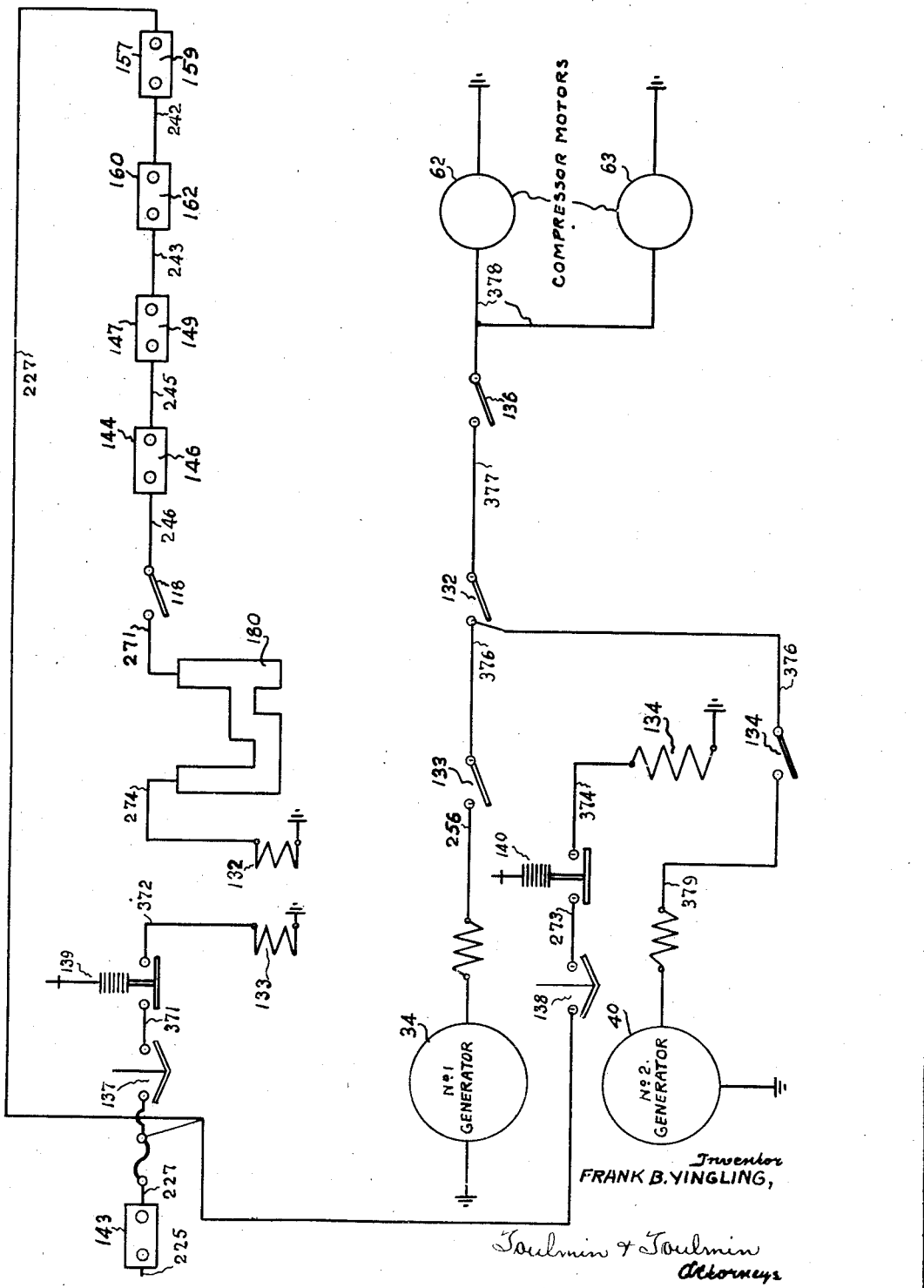
Figure 27 is an individual wiring diagram showing the power and control circuits for the motor driven air compressors.

The motor-driven air compressors may be activated from either generator (Figure 27). The control switch 143 and the first engine fuel switch 150, of course, remain closed, and the forward-and-reverse drum is set in some position other than its "off" position, such as "forward", "reverse" or "engine only" positions. In any of these positions the line 274 is energized from the forward-and-reverse drum 180. Current then passes along the line 274 through the conduits 276, 233 and 370 to and through the operating coil of the compressor motor contactor switch 132, energizing it and passing to the ground, completing the circuit. This energization closes the main contactor of the compressor motor contactor switch 132 for the passage of power current. Meanwhile, the operation of the Diesel engines 31 and/or 38 operating the locomotive causes the temperature to rise to such a point that the normally-open temperature relays 139 and/or 140 are caused to close. Finally the normally-open speed relays 137 and 138 close as the engine or engines attain idling speed. When the above-mentioned steps are performed, current passes from the control switch 143 or 156 on the switchboards 77 and/or 76 respectively, through the previously mentioned conduits to the speed relays 137 and/or 138. From the now-closed speed relay 137, the current passes along the line 371 to and through the now-closed temperature relay 139, thence by the line 372 to and through the operating coil of the first engine cooling motor contactor switch 133, energizing it and passing to the ground. The second engine cooling motor contactor switch 134 is energized in a similar manner by current along the line 227, the speed relay 138, the line 373, the temperature relay 140, and the line 374 to and through its operating coil to the ground. (Figure 33).

The energization of the first engine cooling motor contactor switch 133 closes its main contactor, and the previously described energization of the compressor motor contactor switch 132 has likewise closed the latter's main contactor. Power current now flows from the first generator 34 along the line 256 through the conduit 375 to and through the main now-closed contactor of the first engine cooling motor contactor switch 133, thence along the line 376 to and through the now-closed main contactor of the compressor motor contactor switch 132, thence along the line 377 to and through the air compressor pressure switch 136 and thence along the line 378 to and through the compressor motors 62 and 63 to the ground, completing the circuit. (Figures 5, 6, 27 and 33).

The power current is similarly free to flow along the line 379 from the second generator 40 when the latter is in use and the above operations have been performed, to and through the now-closed main contactor of the second engine cooling motor contactor 134, there joining the line 376 which proceeds to the air compressor pressure switch 136 and the compressor motors 62 and 63 in the manner previously described.

*Operation of fan and vacuum pump motors (Figures 5, 6, 28 and 33)*

The engine cooling fan motors 22 and 23, and the engine cooling vacuum pump motors 25 and 26 are located at either end of the locomotive, as previously described, and are supplied with current from either or both of the generators 34 and 40 by way of the power lines 256 and 379 therefrom, respectively. The admission of the current is regulated by the first and second engine cooling motor contactor switches 133 and 134. For purposes of illustration, it will be assumed that these auxiliary motors are activated from the first generator 34 (Figure 28), it being understood that their activation from the second generator 40 would be essentially similar.

After the first Diesel engine 31 is started and its speed increases beyond a predetermined value, the normally-open speed relay 137 closes automatically; and as the temperature of the engine rises beyond a predetermined amount, the normally-open temperature relay 139 likewise closes. (Figures 28 and 33). Control current then flows from either control switch 156 or 143 through the line 227 in the manner described above under the operation of the air compressor motors, to and through the speed relay 137 and temperature relay 139, thence by the line 372 to and through the operating coil of the first engine cooling motor contactor switch 133, energizing it and closing its contactor switch. Power current now flows from the first generator 34 along the line 256 through the conduit 375 to and through the now-closed main contactor of the first engine cooling motor contactor switch 133, thence along three branches 376 therefrom, two of which lead to the engine cooling vacuum pump motors 25 and 26, whereas the third leads through the fan motor reverser 380, thence by the line 381 or 382 (depending upon the direction of movement of the locomotive), to and through the engine cooling fan motors 22 and 23. In this manner the engine cooling vacuum pump motors 25 and 26 are automatically caused to operate, and the engine cooling fan motors 22 and 23 caused to rotate in the proper direction and reverse themselves when the locomotive reverses its direction of travel.

To actuate the fan motor reverser 380 in such a manner as to cause the engine cooling fan motors 22 and 23 to reverse themselves when the locomotive is reversed, lines 272 and 273 carry control current from the forward-and-reverse drum 180 or 181 to the opposite terminals of the fan motor reverser 380 by way of the conduits previously described, and thence through its operating coils to the ground. (Figures 28 and 33). In this manner the fan motor reverser 380 is synchronized to follow the forward or reverse motions of the forward-and-reverse drum 180 or 181, and the fans caused to operate in the proper directions, whatever the direction of travel of the locomotive may be.

*Traction motor cooling blower motor circuit (Figures 5, 6, 28 and 33)*

The blower motor 66 operates the blower units 65 which carry a cooling blast of air to the traction motors 71, 72, 73 and 74 by way of the conduits 75 and 76 (Figure 3). The blower motor comes into operation automatically when the temperatures of the traction motors 71, 72, 73 or 74 rise beyond a predetermined value, by reason of the closing of the normally-open blower motor temperature relays 141 and 142 (Figure 33), each of these temperature relays controlling a pair of the traction motors. When the blower motor temperature relays 141 and/or 142 close in this manner, control current flows from the control switch 156 on the switchboard 77 along the line 227 through the conduits 244, 234, 233 and 370 to and through the blower motor temperature relays 141 and/or 142. Beyond these the control current passes along the line 383 back to and through the operating coil of the blower motor contactor switch 135 in the third control cabinet 75 (Figure 33), energizing it and passing to the ground, completing the circuit.

With the main contactor of the blower motor contactor switch 135 thus closed by the energization of its operating coil, power current can now run from either generator 34 or 40 along the power line 256 or 370 through the conduit 375 to and through the normally-open now-closed main contactor of the engine cooling motor contactor switch 133 or 134, the operating coil of which has been energized as described previously, thence along a fourth branch of the line 376 to but not through the main contactor of the second engine cooling motor contact switch 134, thence along the line 376 to and through the normally-open but now-closed main contactor of the blower motor contactor switch 135, thence along the line 384 to the blower motor 66, actuating it and passing to the ground.

A subsequent lowering of the temperatures of the traction motors 71 and 72 or 73 and 74 below the set temperatures of the temperature relays 141 and 142 will cause the contacts of the latter to open, breaking the circuit and stopping the blower motor.

While the operation of the blower motor circuit has been described as activated from the first generator 34, the activation from the second generator 40 is obviously similar, supplying power current through the line 379 and the conduit 375 to and through the main contactor of the second engine cooling motor contactor 134, thence through the now-closed main contactor of the blower motor contactor switch 135 and thence along the line 384 to and through the windings of the blower motor 66. (Figure 28).

*Operation of ventilator and shutter regulating circuit (Figures 1, 35 and 36)*

Figure 35:
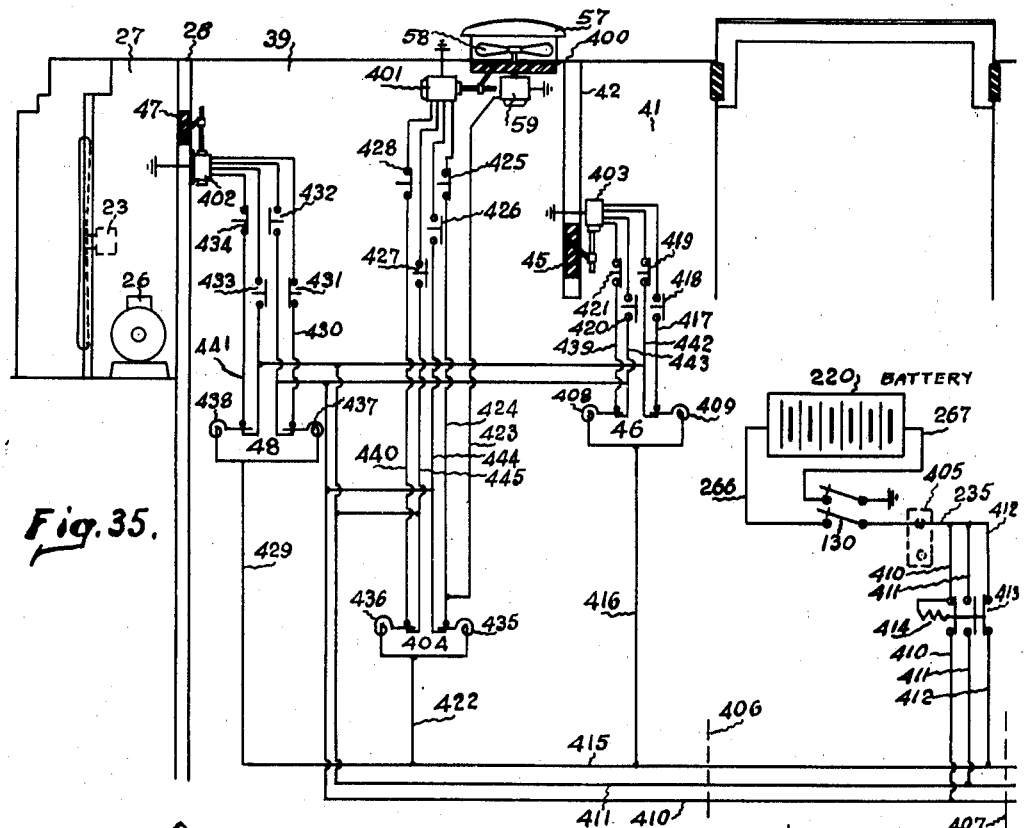
Figure 35 is a wiring diagram of the ventilator motor and ventilation control system in one end of the locomotive, that in the other end being an exact duplicate thereof.

The locomotive, as has been previously described, is divided up into a plurality of chambers separated from one another by partitions, having interconnecting shutters therethrough (Figures 1 and 35). The extreme ends of the locomotive contain the fan compartments 27 which are operated from the engine compartments 32 and 39 by the partitions 28 having the movable shutters 47 therethrough. The engine compartments 32 and 39 are similarly separated from the generator compartments 35 and 41 by the partitions 33 and 42 having the movable shutters 44 and 45 therethrough. Finally the roof 56 is provided with domes 57 having generator fans 58 driven by electric motors 59 for the purpose of withdrawing the heated air from the engine compartments. Between the fan 58 and its motor 59 are ventilating shutters 400 which are closed and opened by the electric motor 401 controlled as hereinafter described. The partition shutters 47 are operated by similarly controlled electric motors 402. The partition shutters 44 and 45 are opened and closed by similarly controlled motors 403, only one motor being shown (Figure 35). The motors 402 are electrothermostatically controlled by the thermostatic relays 48; the motors 403 by the electro-thermostatic relays 46; and the motors 59 and 401 by the electro-thermostatic relays 404 (Figure 35).

Current for operating the various ventilating motors is normally supplied by the battery 220, since the current consumption thereof is very low; it is obvious, however, that these motors might be operated directly from the generator 34 or 40 by inserting a generator contactor switch immediately on the opposite side of the battery switch 130 from the battery 220, as indicated by the dotted lines 405 in Figure 35.

From a comparison of Figures 1 and 35, it will be observed that Figure 35 shows the ventilation wiring diagram for one-half only of the locomotive. The wiring diagram for the ventilator circuit in the other half of the locomotive is exactly the same as the wiring diagram to the left of the dotted line 406 of Figure 35 and is connected to the right of the dotted line 407 in exactly the same manner as the half shown.

Figure 36:
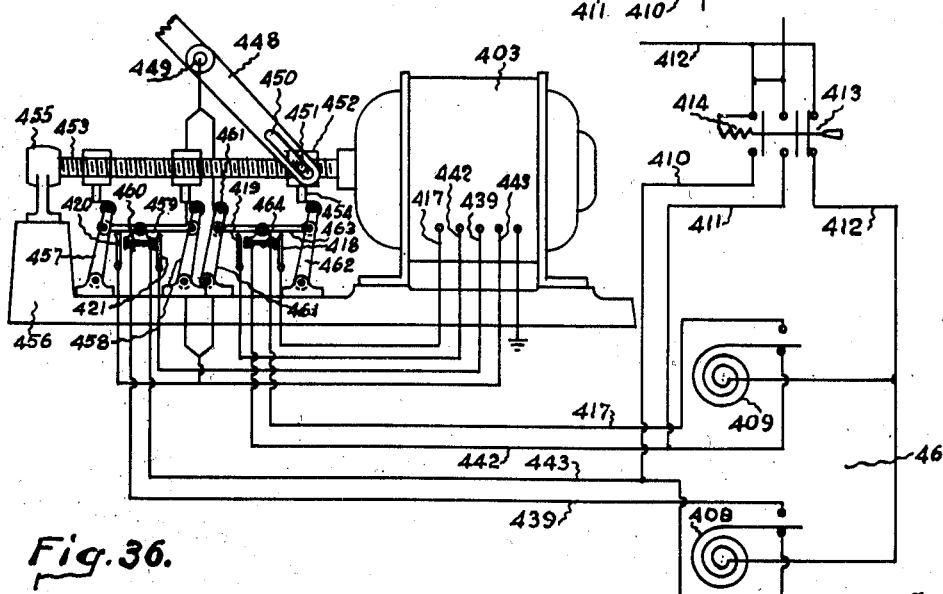
Figure 36 is an enlarged view of a part of the wiring diagram of Figure 35, showing an individual ventilator motor with its mechanically-thrown switch and electrical circuit.

It will be observed that the thermostatic relays 48, 404 and 46 are each composed of two units, the details of which are shown in Figure 36. These thermostatic relays are similar in construction, but are set to open and close at the different temperatures suitable for the most efficient operation of the machinery in the compartments which they serve.

The thermostat 46 (Figure 36) thus consists of a high-set thermostatic relay member 408 and a low-set relay member 409. The purpose of having these two members is to provide a means of causing the shutters 45 to be opened half way by the low-set relay member 409 and thence further to the fullest extent by the relay unit 408 if the temperature persists in rising after the shutters 45 are half open.

From the battery switch 130, the line 235 carries current through one of the three branch lines 410, 411 and 412, depending upon the setting of the relays. Arranged to close the circuits of the lines 410 and 411, and to open the circuit of the line 412 is a magnetically held manual switch 413 (Figures 35 and 36). When this switch is closed, the current which it carries energizes its holding coil 414, thus retaining the switch in its closed position and affecting the circuits 410, 411 and 412, as just described. This switch 413 is designed to be closed by the engineer on leaving the cab, so that the various ventilators will remain closed and the thermostats be rendered inactive until he returns, in order to conserve the heat within the various compartments. Normally, however, when the engineer is in his cab, the switch 413 remains open as shown in Figures 35 and 36.

Assuming that this is the case, and that the engines have just been started so that the temperatures in the various compartments are too low to activate the thermostatic relays 46, 48 and 404, these will remain in the positions shown in Figures 35 and 36 until the temperature rises. Consequently no current can flow from the battery 220 to the various motors, and the shutters remain closed as the machinery heats up the various compartments.

When the temperature in each compartment exceeds the set temperature of the low-set relay member 409, the latter shifts, allowing current to flow from the battery through the switch 130 and the lines 235, 412, 415, 416, the closed low-set relay member of the thermostatic relay 46 and the line 417 by way of the motor-operated switch 418 to the generator compartment ventilating motor 403, causing it to operate and open the shutters 45 half way, the motion thereof being halted by the motor-operated switches 418, 419, 420 and 421 described below. (Figures 35 and 36).

Under the same conditions, current flows from the line 415 through the line 422 and the now-closed low-set relay member 435 of the thermostatic relay 404 along the lines 423 and 424 to the motors 59 and 401 respectively, causing them to operate. The motor 59 then turns the ventilating fan 58 in the dome 57 while the motor 401 half opens the ventilator shutters 400 situated between the fan 58 and the motor 59. The action of the motor 401 is halted by the operation of the motor-thrown switches 425, 426, 427 and 428 hereinafter described, these switches being similar in construction and operation to the motor-thrown switches 418, 419, 420 and 421.

In a like manner the ventilator shutters 47 are half opened by the action of current flowing from the line 415 along the branch line 429 through the now-closed low-set relay member 437 of the thermostatic relay 48, thence along the line 430 through the initially closed motor-thrown switch 431 to the motor 402, causing it to operate until the shutters 47 are half way open, the action thereof being halted by the working of the motor-thrown switches 431, 432, 433 and 434 in a manner similar to that of the motor-thrown switches 418, 419, 420 and 421. (Figures 35 and 36).

If the temperatures in the various compartments continue rising with the shutters half open, the high-set relay members 408, 436 and 438 of the thermostatic relays 46, 404 and 48 respectively become activated and shift. This enables current to flow from the line 412 through the now-closed high-set relay member 408 of the thermostatic relay 46, thence along the line 439 through the motor-thrown switch 421 to the generator compartment ventilating motor 403, causing it to rotate and open the shutters 45 to their fullest extent. (Figures 35 and 36).

Similarly the closing of the high-set relay member 436 of the thermostatic relay 404 allows current to flow therethrough from the line 422 into the line 440 and through the motor-thrown switch 428 to the dome shutter-opening motor 401. The latter is thus caused to open the shutters 400 to their fullest extent. The fan motor 59 and its fan 58 meanwhile remain in operation by current received through the line 423. (Figures 35 and 36).

In a like manner the closing of the high-set relay member 438 of the thermostatic relay 48 allows current to flow therethrough from the line 429 into the line 441, thence through the motor-thrown switch 434 to the motor 402. This motor is thus caused to rotate and opens the shutters 47 to their fullest extent. (Figures 35 and 36).

In a manner to be described below, each of the several shutter-opening motors 401, 402 and 402 ceases to operate when it has reached its half-way position after the closing of the low-set relay members 409, 435 or 437. When the high-set relay members 408, 436 and 438 are shifted through the rising of the temperatures in their several compartments, the motors 401, 402 and 403 open their shutters to the fullest extent and then cease operation through the working of similar mechanism. (Figures 35 and 36).

The mechanism which causes the several motors to start and stop at their half-way or wide open positions is shown in Figure 36. The motor 403 is chosen for illustrative purposes, but it will be understood that the action of the mechanism operated by the motors 402 and 401 is essentially the same.

The shutters 45 are connected to the shutter arm 448 which is pivotally mounted at 449 and has a slotted engagement 450 with the pin 451 of a slider 452 (Figure 36). The interior of the slider 452 is threaded and these threads engage the corresponding threads of a screw shaft 453. The slider 452 also carries a projection 454 extending outward therefrom. The screw shaft 453 is a continuation of the shaft of the motor 403, and is journaled at its outer end in the shaft hanger 455 which in turn is supported upon the base 456. Also mounted upon the base 456 is a plurality of swinging arms. The swinging arms 457 and 458 are pivotally mounted upon the base 456. The swinging arms 457 and 458 are pivotally joined by a connecting rod 459 which carries a movable switch arm 460. The latter alternately engages the fixed contacts 421 or 420 when the swinging arms 457 and 458 move from one extreme position to the other. The upper ends of the swinging arms 457 and 458 are of such length as to be easily engaged by the slider projection 454 as the slider 452 passes to and fro along the screw shaft 453 when the latter is turned by the motor 403.

In a similar way, the pivotally mounted swinging arms 461 and 462 are pivotally linked by the connecting rod 463 which in turn carries the movable switch arm 464. The latter alternately engages the fixed contacts 418 or 419 in a manner similar to that previously described for the movable switch arm 460. (Figure 36).

In Figure 36 the mechanism is shown in the position occupied when the compartment is colder than the set temperature of either of the relay members. When the temperature of the compartment rises, the consequent shift of the thermostatic relay member 408 allows current to pass therethrough to the motor 403 along the line 417, by way of the switch arm 464 and the fixed contact 418. The motor then starts, rotating the screw shaft 453 and causing the slider 452 to move therealong until its projecting portion 454 engages the swinging arm 461 and pulls the switch arm 464 away from the fixed contact 418 and into engagement with the fixed contact 419. This breaks the motor circuit and the motor then stops with the shutters half open.

If the temperature in the compartment continues to rise despite the air admitted by the half open shutters, the high-set relay member 408 of the thermostatic relay 46 shifts, allowing current to flow therethrough from the line 412 through the line 439 to the motor 403 by way of the switch arm 460 and the fixed contact 421. (Figure 36). The motor is thus caused to rotate and the slider 452 moves still farther along the screw shaft 453 until the projection 454 therefrom engages the swinging arm 457 and moves it to the left, breaking the circuit between the switch arm 460 and the fixed contact 421, and closing the circuit between the former and the fixed contact 420. The shutters now remain fully open.

As soon as the temperature of the compartment drops a sufficient amount to shift the high-set relay member 408, the motor starts operating in the reverse direction by means of current received therethrough by way of the line 443, the switch arm 460 and the fixed contact 420. (Figure 36).

As the slider moves in the reverse direction back along the screw shaft 453, its projection 452 engages the swinging shaft 458 and breaks the circuit between the moving switch arm 460 and the fixed contact 420, re-engaging the former with the fixed contact 421. The motor thus stops rotating, again leaving the shutters half open. With a further drop of temperature so that the low-set relay member 409 shifts, the current passes therethrough along the line 442, by way of the moving switch arm 464 and the fixed contact 419 to the motor 403. The latter then rotates in a reverse direction and the slider 452 moves backward to its starting point shown in Figure 36 until the projection 454 therefrom engages the swinging arm 462, thereby breaking the circuit between the moving switch arm 464 and the fixed contact 419 and closing the circuit between the former and the fixed contact 418. The motor then stops with the shutters fully closed.

Thus, as the temperature of the compartment rises or falls, the motor moves forward or backward and opens the shutters either half-way or wide open according to the action of the low-set or high-set members of the thermostatic relays. When the hand switch 413 is closed, it disconnects the thermostatic relay circuit from the battery and connects the latter directly to the motor 403 as shown in Figure 36, causing the shutters to be closed and thus retaining the heat in the several compartments while the locomotive is standing idle. The switch 413 is held in its closed position by the magnetic solenoid coil 414.

The action of the shutter-operating motors 401 and 402 is substantially the same as that of the motor 403 just described. (Figure 36.) When the battery switch 130 is opened after the hand switch 413 has been closed and all the shutters have likewise closed, the circuit in the holding coil of the switch 413 is broken, thus releasing the plunger of the latter and returning the switch 413 to the position shown in Figures 35 and 36.

*Operation of two locomotives in tandem with automatic control features (Figure 30)*

The automatic control features as described above may also be utilized in operating two locomotives in tandem. At the outset it will be assumed that one engine of each locomotive has been started and that the two locomotives are facing in the same direction, that is, the rear end of the leading locomotive is coupled to the front end of the second locomotive. This arrangement of the two locomotives is necessary in order that the circuits controlling the forward and reverse motions of the locomotives are properly made.

It is possible to install automatic starting features for automatically starting both engines in the trailing locomotive. This is ordinarily an unnecessary refinement, however, since it is usually advisable to station a workman in the second locomotive for the purpose of watching the engines and the various auxiliaries. This workman takes no part in the operation of the locomotives while they are in transit, but his presence is advisable from the point of safety. This second workman or engine tender, therefore, is free to start one engine in the second locomotive at the time the journey commences. After the first engine is started, however, the second engine and its generator will be automatically cut in or cut out by the same control features that are provided for this purpose in the first locomotive.

In order to couple the locomotives together, a multiple connection device is provided as shown in Figure 30. The various control cables which are necessary for operating a second locomotive or which may serve to operate the locomotive under discussion as a second locomotive are collected and caused to enter the conduit 470, whence they proceed through the branch conduits 471 and 472 to jumper junction boxes 222 and 223 at each end of the locomotive. The jumper junction boxes 222 and 223 are equipped with multiple contact members insulated from each other, to which each of the individual cables is connected. Two successive locomotives are interconnected by a multiple conductor cable which has each of its individual conductors joined to corresponding terminals of the junction boxes. The three controllers of the two locomotives not in use are preferably locked and the two locomotives controlled as one unit from the single controller which the operator has chosen to use. Three or more locomotives may be controlled from a single operating station by the use of a similar equipment.

The tandem connection conduits 470, 471 and 472 carry the tandem connected control circuits such as the circuits 272, 274, 320, 273, 385, 386, 277, 389, 388 and 387. Each of these control circuits has its individual conductor in the conduits 470, 471 and 472 as well as an individual terminal in the jumper junction boxes 222 and 223. (Figure 30.) In addition to these circuits, the special automatic control features are allotted additional individual conductors and terminals in these conduits and junction boxes. Among the circuits so joined are the line 473 running from the set-time relay 116 to the blade of the selective underload engine cut-out switch 117, the line 474 running from the time over-current relay 185 to the second engine starting switch operator 169, the similar lines 350 and 353, and the lines 367 and 368 connected to the first and second throttle operators 204 and 205 respectively.

With the two or more locomotives thus interconnected, the operator in the working control station may operate all the locomotives as one unit, and their second engines will cut in or cut out automatically, and their governor lifting apparatus automatically operate whenever the load demand calls for such action in the first locomotive.

It will be understood that I desire to comprehend within my invention such modifications as may be necessary to adapt it to varying conditions and uses.

Having thus fully described my invention, what I claim as new and desire to secure by Letters Patent is:

1. A Diesel-electric locomotive control system including a pair of Diesel engines, an electric generator operated by each engine, locomotive running gear, a traction motor for driving said running gear, an electric circuit interconnecting said traction motor and said electric generators, a controller for regulating the application of generator current to the traction motor, current-responsive means adapted to place said second electric generator in current-producing relationship in said circuit when the amperage therein exceeds a predetermined amount beyond a predetermined length of time, means for shifting the controller to its inoperative position when said current-responsive means becomes operative, and means for returning said controller to its previous position after said second electric generator begins delivering current to said circuit.

2. A Diesel-electric locomotive control system including a pair of Diesel engines, an electric generator operated by each engine, locomotive running gear, a traction motor for driving said running gear, an electric circuit interconnecting said traction motor and said electric generators, a current-sensitive relay and a time-responsive relay respectively adapted to close when the amperage in said electrical circuit falls below a predetermined amount beyond a predetermined length of time, an engine and generator disconnecting circuit controlled by said relays to disconnect said second engine generator assembly when such underload develops, and a delay action switch in said relay circuit arranged when closed to postpone the action of said relays, whereby the timing mechanism of said time-sensitive relay is returned to zero by the closing of said delay action switch.

3. An automatic underload auxiliary engine-generator disconnecting system for a Diesel-electric locomotive including a current-sensitive relay and a time-responsive relay respectively adapted to close when the amperage in the power circuit of said locomotive falls below a predetermined amount beyond a predetermined period of time, engine and generator disconnecting switches controlled by said relays, and a delay action switch in said relay circuit arranged when closed to postpone the action of said relays, whereby the timing mechanism of said time-sensitive relay is returned to zero by the closing of said delay action switch.

4. A Diesel-electric locomotive control system including a pair of Diesel engines, an electric generator operated by each engine, locomotive running gear, a traction motor for driving said running gear, an electric circuit interconnecting said traction motor and said electric generator, a maximum current-sensitive relay adapted to close and energize the second engine-generator circuit when the current from the first engine-generator exceeds a predetermined maximum beyond a predetermined period of time, and a minimum current-sensitive relay and a time-responsive relay respectively adapted to close and disconnect the second engine generator circuit when the current from the combined engine generator circuits falls below a predetermined minimum beyond a predetermined period of time.

5. A Diesel-electric locomotive control system including a pair of Diesel engines, an electric generator operated by each engine, locomotive running gear, a traction motor for driving said running gear, an electric circuit interconnecting said traction motor and said electric generator, a maximum current-sensitive relay adapted to close and energize the second engine-generator circuit when the current from the first engine-generator exceeds a predetermined maximum beyond a predetermined period of time, a minimum current-sensitive relay and a time-responsive relay respectively adapted to close and disconnect the second engine generator circuit when the current from the combined engine generator circuits falls below a predetermined minimum beyond a predetermined period of time, and a delay action switch in said time-sensitive relay circuit arranged when closed to postpone the action of said time-sensitive relay, whereby the timing mechanism of said time sensitive relay is returned to zero by the closing of said delay action switch.

6. A Diesel-electric locomotive control system including a Diesel-engine with a speed regulator, an electric generator operated by said engine, locomotive running gear, a traction motor for driving said running gear, an electric circuit interconnecting said generator and said traction motor, and a circuit for increasing the speed regulation limit of said speed regulator and a circuit for starting and connecting a second Diesel engine-generator assembly to said first engine-generator circuit when the amperage in said latter circuit exceeds a predetermined maximum beyond a predetermined period of time.

7. A Diesel-electric locomotive control system including a Diesel-engine with a speed regulator, an electric generator operated by said engine, locomotive running gear, a traction motor for driving said running gear, an electric circuit interconnecting said generator and said traction motor, a circuit for increasing the speed regulation limit of said speed regulator and a circuit for starting and connecting a second Diesel engine-generator assembly to said first engine-generator circuit when the amperage in said latter circuit exceeds a predetermined maximum beyond a predetermined period of time, and a circuit for disconnecting said second engine-generator circuit from said first engine-generator circuit when the amperage in said latter circuit falls below a predetermined minimum beyond a predetermined period of time.

FRANK B. YINGLING.